(12) United States Patent
Tian et al.

(10) Patent No.: US 11,171,814 B2
(45) Date of Patent: Nov. 9, 2021

(54) CORRELATION-BASED CHANNEL FEEDBACK

(71) Applicant: QUALCOMM Incorporated, San Diego, CA (US)

(72) Inventors: Bin Tian, San Diego, CA (US); Lin Yang, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/786,890

(22) Filed: Feb. 10, 2020

(65) Prior Publication Data

US 2020/0336341 A1 Oct. 22, 2020

Related U.S. Application Data

(60) Provisional application No. 62/836,951, filed on Apr. 22, 2019.

(51) Int. Cl.
| | |
|---|---|
| *H04L 25/02* | (2006.01) |
| *H04B 7/06* | (2006.01) |
| *H04L 27/26* | (2006.01) |
| *H04B 7/0452* | (2017.01) |
| *H04B 7/0417* | (2017.01) |

(52) U.S. Cl.
CPC ....... *H04L 25/0248* (2013.01); *H04B 7/0417* (2013.01); *H04B 7/0452* (2013.01); *H04B 7/0617* (2013.01); *H04B 7/0663* (2013.01); *H04L 25/0204* (2013.01); *H04L 25/0226* (2013.01); *H04L 27/2605* (2013.01)

(58) Field of Classification Search
CPC ............. H04L 25/0248; H04L 25/0204; H04L 25/0226; H04L 27/2605; H04B 7/0417; H04B 7/0452; H04B 7/0617; H04B 7/0663
See application file for complete search history.

(56) References Cited

U.S. PATENT DOCUMENTS 10,686,572 B2 * 6/2020 Kundargi .......... H04W 56/0035
2016/0353370 A1 * 12/2016 Choi .................... H04W 48/20
(Continued)

*Primary Examiner* — Jaison Joseph
(74) *Attorney, Agent, or Firm* — Kevin M. Donnelly

(57) ABSTRACT

This disclosure provides methods, devices and systems for providing channel feedback for multiple spatial streams. In some implementations, the techniques involve generating distinct channel estimates for different respective sets of orthogonal spatial streams. In some implementations, the orthogonality of the different sets of orthogonal spatial streams enables the beamformee to distinguish the spatial streams to provide the separate channel estimates. The beamformee may then determine separate correlations for the different respective sets of spatial streams. In some implementations, the beamformee combines the correlations to determine an average correlation for each of a number of sets of frequency tones. The beamformee may then perform an eigenvalue decomposition on a tone-by-tone basis based on the respective average correlation and the channel estimate obtained for the tone. Because the eigenvalue decomposition may be performed on each of the two sets of spatial streams separately, the complexity involved with performing each eigenvalue decomposition is greatly reduced.

29 Claims, 13 Drawing Sheets

(56) References Cited

U.S. PATENT DOCUMENTS

2018/0011179 A1* 1/2018 Zhang .................... H04L 69/22
2018/0131540 A1* 5/2018 Malik ................. H04L 27/2663
2020/0091970 A1* 3/2020 Lee ..................... H04B 7/0417

* cited by examiner

CORRELATION-BASED CHANNEL FEEDBACK

PRIORITY INFORMATION

This patent application claims priority under 35 U.S.C. 119(e) to U.S. provisional patent application Ser. No. 62/836,951 entitled "Correlation-based Channel Feedback" and filed on 22 Apr. 2019, the content of which is hereby incorporated by reference herein for all purposes.

TECHNICAL FIELD

This disclosure relates generally to wireless communication, and more specifically, to techniques for providing channel feedback for multiple spatial streams.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some APs and STAs support beamforming. To obtain the channel state information (CSI) necessary for beamforming, the beamformer may perform a channel sounding procedure with the beamformee. For example, the beamformer may transmit one or more sounding signals to the beamformee. The beamformee may then perform measurements based on the sounding signal and generate and transmit channel feedback information to the beamformer. The beamformer may then precode data streams for subsequent transmissions to the beamformee. As wireless communication techniques advance, it is becoming desirable to increase the number of transmit antennas and thus the number of possible spatial streams, for example, to achieve gains in beamforming. However, both the duration of the sounding signal as well as the size of the channel feedback information increases linearly with the number of spatial streams. Furthermore, the complexity involved with generating the channel feedback information increases significantly with the number of spatial streams. In some examples, the beamformer may include transmit antennas for transmitting more spatial streams than the beamformee may be capable of providing channel feedback information for.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes receiving, from a second wireless communication device, a sounding packet including a sequence of sounding symbols, the sequence of sounding symbols being received via a plurality of spatial streams and via a plurality of tones. The method includes performing measurements on the plurality of tones based on the received sounding symbols. The method includes determining a first channel estimate for a first set of spatial streams of the plurality of spatial streams for each tone of a first set of tones of the plurality of tones based on the measurements. Similarly, the method includes determining a second channel estimate for a second set of spatial streams of the plurality of spatial streams for each tone of a second set of tones of the plurality of tones based on the measurements. The method also includes determining a first correlation for the first set of spatial streams for each tone of the first set of tones based on the first channel estimate. Similarly, the method includes determining a second correlation for the second set of spatial streams for each tone of the second set of tones based on the second channel estimate. The method additionally includes determining an average correlation for each of a number of sets of adjacent tones of the plurality of tones based on averaging the first and the second correlations for the tones in the respective set of adjacent tones. The method further includes determining channel feedback information based on the average correlation, and outputting for transmission one or more packets including the channel feedback information.

Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor. The memory stores processor-readable code that, when executed by the at least one processor in conjunction with the at least one modem, is configured to receive, from a second wireless communication device, a sounding packet including a sequence of sounding symbols, the sequence of sounding symbols being received via a plurality of spatial streams and via a plurality of tones. The code is further configured to perform measurements on the plurality of tones based on the received sounding symbols. The code is further configured to determine a first channel estimate for a first set of spatial streams of the plurality of spatial streams for each tone of a first set of tones of the plurality of tones based on the measurements, and determine a second channel estimate for a second set of spatial streams of the plurality of spatial streams for each tone of a second set of tones of the plurality of tones based on the measurements. The code is further configured to determine a first correlation for the first set of spatial streams for each tone of the first set of tones based on the first channel estimate, and determine a second correlation for the second set of spatial streams for each tone of the second set of tones based on the second channel estimate. The code is further configured to determine an average correlation for each of a number of sets of adjacent tones of the plurality of tones based on averaging the first and the second correlations for the tones in the respective set of adjacent tones. The code is further configured to determine channel feedback information based on the average correlation, and output for transmission one or more packets including the channel feedback information.

Another innovative aspect of the subject matter described in this disclosure can be implemented in a method for wireless communication. The method includes generating a sounding packet including a sequence of sounding symbols to be transmitted via each of a plurality of spatial streams and via a plurality of tones. The method includes partitioning the spatial streams into a first set of spatial streams and a second set of spatial streams. The method also includes orthogonalizing the first and the second sets of spatial streams such that each spatial stream in the second set of spatial streams is orthogonal to each spatial stream in the first set of spatial streams in one or both of time or frequency. The method additionally includes outputting the sounding packet including the orthogonalized first and second sets of spatial streams for transmission to a second wireless communication device. In some implementations, the method further includes receiving one or more packets from the second wireless communication device based on the sounding packet, the one or more packets including channel feedback information for the first and second sets of spatial streams. The method also includes determining one or more precoding matrices based on the channel feedback information. The method additionally includes generating at least one physical layer convergence protocol (PLCP) protocol data unit (PPDU) including data to be transmitted to the second wireless communication device via one or more data streams. The method further includes generating one or more precoded streams based on applying the one or more precoding matrices to the one or more data streams, and outputting the one or more precoded streams for transmission to the second wireless communication device Another innovative aspect of the subject matter described in this disclosure can be implemented in a wireless communication device. The wireless communication device includes at least one modem, at least one processor communicatively coupled with the at least one modem, and at least one memory communicatively coupled with the at least one processor. The at least one memory stores processor-readable code that, when executed by the at least one processor in conjunction with the at least one modem, is configured to generate a sounding packet including a sequence of sounding symbols to be transmitted via each of a plurality of spatial streams and via a plurality of tones. The code is further configured to partition the spatial streams into a first set of spatial streams and a second set of spatial streams. The code is further configured to orthogonalize the first and the second sets of spatial streams such that each spatial stream in the second set of spatial streams is orthogonal to each spatial stream in the first set of spatial streams in one or both of time or frequency. The code is further configured to output the sounding packet including the orthogonalized first and second sets of spatial streams for transmission to a second wireless communication device. In some implementations, the code is further configured to receive one or more packets from the second wireless communication device based on the sounding packet, the one or more packets including channel feedback information for the first and second sets of spatial streams. The code is further configured to determine one or more precoding matrices based on the channel feedback information. The code is further configured to generate at least one PPDU including data to be transmitted to the second wireless communication device via one or more data streams. The code is further configured to generate one or more precoded streams based on applying the one or more precoding matrices to the one or more data streams, and output the one or more precoded streams for transmission to the second wireless communication device.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
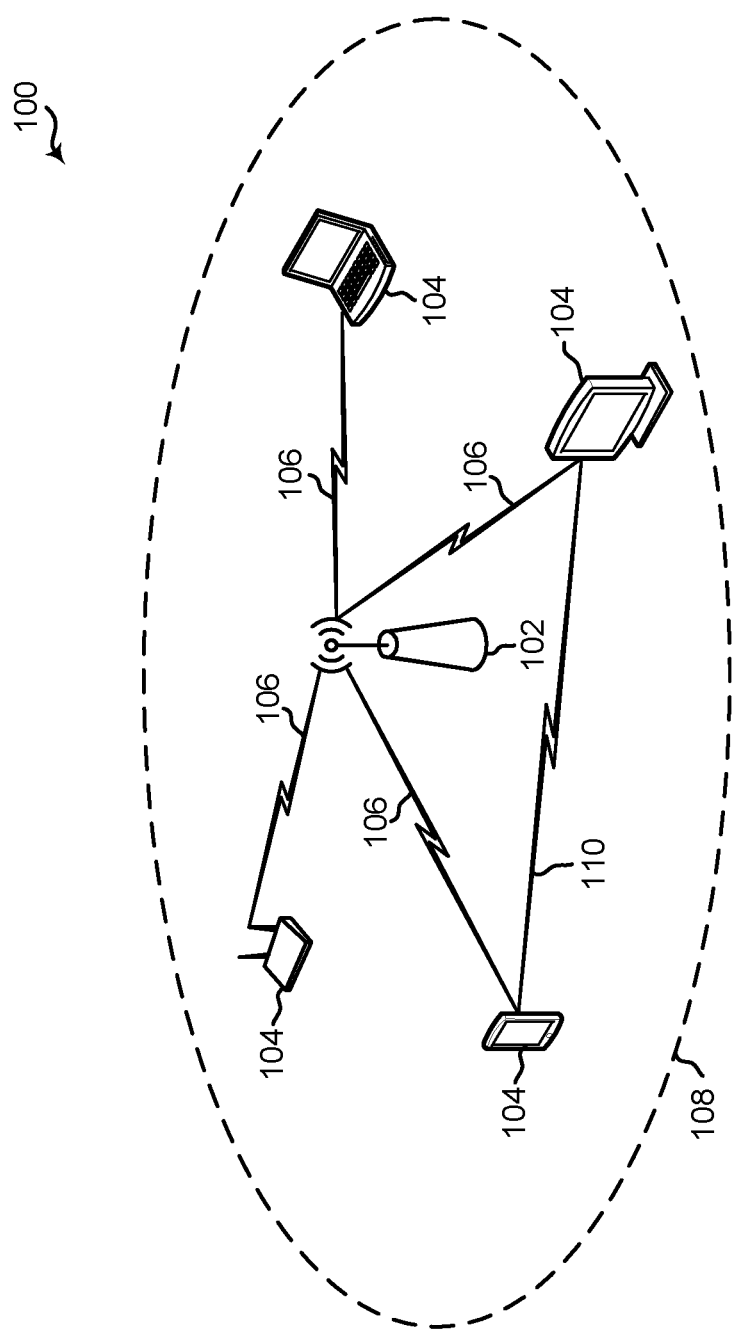
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to providing channel feedback for multiple spatial streams. Some implementations more specifically relate to techniques for reducing the receiver-side complexity and processing involved with generating channel feedback as part of a sounding operation. In some implementations, the techniques involve generating distinct channel estimates for different respective sets of orthogonal spatial streams. In some implementations, the orthogonality of the different sets of orthogonal spatial streams enables the beamformee to distinguish the spatial streams to provide the separate channel estimates. The beamformee may then determine separate receive antenna correlations for the different respective sets of spatial streams. In some implementations, the beamformee combines the receive antenna correlations to determine an average correlation for each of a number of sets of frequency tones. The beamformee may then perform an eigenvalue decomposition on a tone-by-tone basis based on the respective average correlation and the channel estimate obtained for the tone. Because the eigenvalue decomposition may be performed on each of the two sets of spatial streams separately, the complexity involved with performing each eigenvalue decomposition is greatly reduced.

Particular implementations of the subject matter described in this disclosure can be implemented to realize one or more of the following potential advantages. In some implementations, the described techniques can be used to achieve gains in beamforming by providing channel feedback for a large number, for example sixteen or more, transmit antennas and corresponding spatial streams transmitted by a beamformer. In some implementations, a beamformee is able to provide feedback for, for example, twice as many spatial streams as it would be able to do conventionally due to, for example, the complex eigenvalue decomposition (for example, singular value decomposition (SVD)) processing required for the larger channel estimates generated when providing feedback for larger numbers of spatial streams. In some specific examples, a beamformee is capable of generating channel feedback information for, for example, sixteen or more spatial streams while being configured to perform eigenvalue decomposition on only, for example, eight or fewer spatial streams. However, the techniques described can be applied to even greater numbers of transmit antennas and associated spatial streams.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B11 within range of the STA or to select among multiple APs 102 that together form an extended service set (ESS) including multiple connected B11. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The legacy preamble may be used for packet detection, automatic gain control and channel estimation, among other uses. The legacy preamble also may be used to maintain compatibility with legacy devices. The format of, coding of, and information provided in the non-legacy portion of the preamble is based on the particular IEEE 802.11 protocol.

Figure 2A:
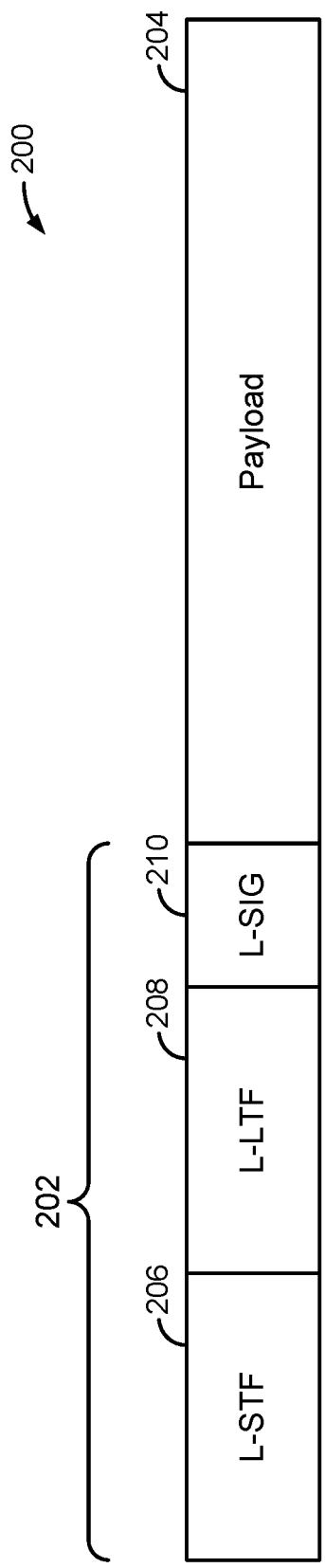
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
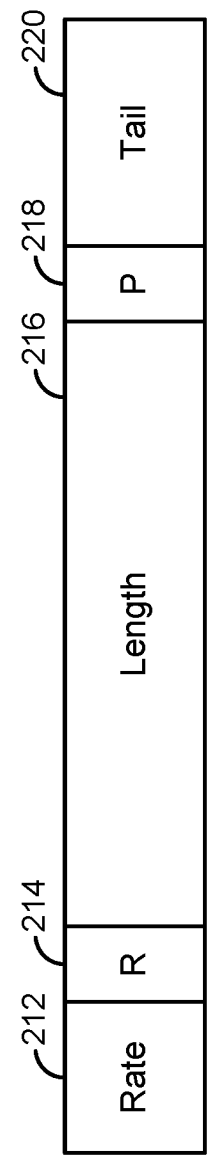
FIG. 2B shows an example field in the PDU of FIG. 2A.

FIG. 2B shows an example L-SIG field 210 in the PDU of FIG. 2A. The L-SIG 210 includes a data rate field 212, a reserved bit 214, a length field 216, a parity bit 218, and a tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect a bit error. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (μs).

Figure 3A:
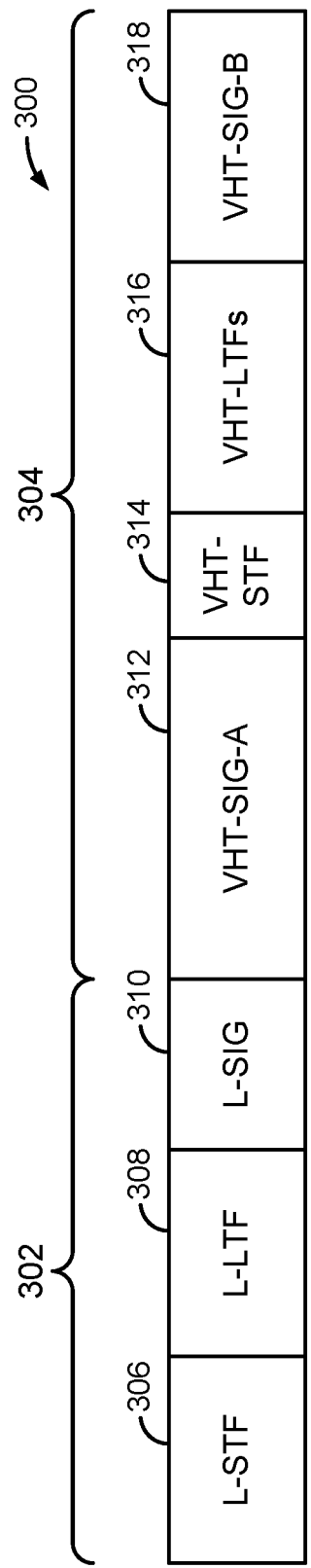
FIG. 3A shows an example physical layer (PHY) preamble usable for communications between an AP and each of a number of STAs.

FIG. 3A shows an example PHY preamble 300 usable for communications between an AP 102 and each of a number of STAs 104. The preamble 300 includes a legacy portion 302 and a non-legacy portion 304. The legacy portion 302 includes an L-STF 306, an L-LTF 308, and an L-SIG 310. The non-legacy preamble portion 304 is formatted as a Very High Throughput (VHT) preamble in accordance with the IEEE 802.11ac amendment to the IEEE 802.11 standard.

The non-legacy preamble portion 304 includes a first VHT signaling field (VHT-SIG-A) 312, a VHT short training field (VHT-STF) 314, one or more VHT long training fields (VHT-LTFs) 316 and a second VHT signaling field (VHT-SIG-B) 318 encoded separately from the VHT-SIG-A field 312. Like the L-STF 306, L-LTF 308, and L-SIG 310, the information in the VHT-SIG-A field 312 may be duplicated and transmitted in each of the component 20 MHz channels in instances involving the use of a bonded channel.

The VHT-STF 214 is used to improve automatic gain control estimation in a MIMO transmission. The VHT-LTFs 216 are used for MIMO channel estimation and pilot subcarrier tracking. The preamble 200 includes one VHT-LTF 216 for each spatial stream the preamble is transmitted on. The VHT-SIG-A field 212 may indicate to VHT-compatible APs 102 and STAs 104 that the PPDU is a VHT PPDU. The VHT-SIG-A field 212 includes signaling information and other information usable by STAs 104 to decode the VHT-SIG-B field 218. The VHT-SIG-A field 212 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. The VHT-SIG-B field 218 is used for MU transmissions and contains the actual data rate and MPDU or A-MPDU length values for each of the multiple STAs 104, as well as signaling information usable by the STAs 104 to decode data received in the payload portion of the PPDU, including, for example, an MCS and beamforming information.

Figure 3B:
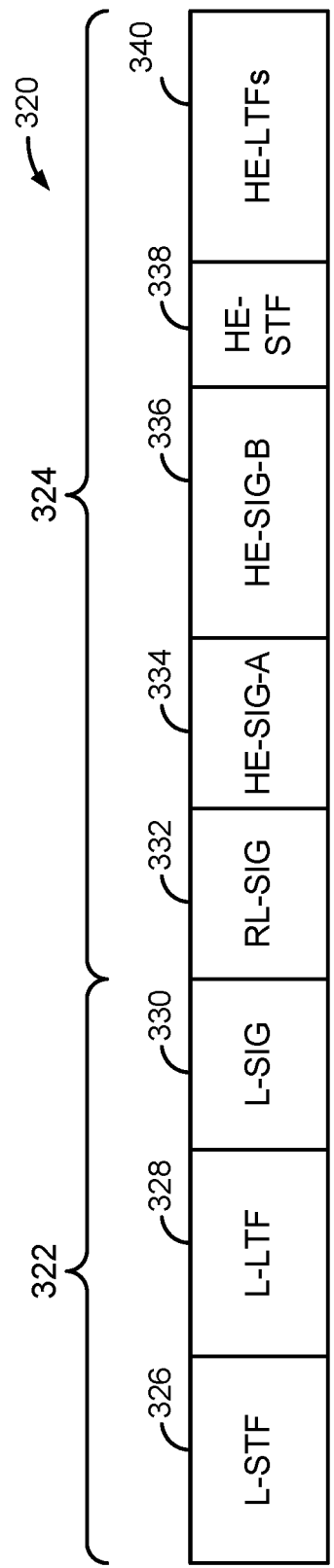
FIG. 3B shows another example PHY preamble usable for communications between an AP and each of a number of stations.

FIG. 3B shows another example PHY preamble 320 usable for communications between an AP 102 and each of a number of stations 104. The preamble 320 may be used for MU-OFDMA or MU-MIMO transmissions. The preamble 320 includes a legacy portion 322 and a non-legacy portion 324. The legacy portion 322 includes an L-STF 326, an L-LTF 328, and an L-SIG 330. The non-legacy preamble portion 304 is formatted as a High Efficiency (HE) WLAN preamble in accordance with the IEEE 802.11ax amendment to the IEEE 802.11 standard. The non-legacy preamble portion 324 includes a repeated legacy signaling field (RL-SIG) 332, a first HE signaling field (HE-SIG-A) 334, a second HE signaling field (HE-SIG-B) 336 encoded separately from the HE-SIG-A field 334, an HE short training field (HE-STF) 338 and HE long training fields (HE-LTFs) 340. Like the L-STF 326, L-LTF 328, and L-SIG 330, the information in the RL-SIG field 332 and the HE-SIG-A field 334 may be duplicated and transmitted in each of the component 20 MHz channels in instances involving the use of a bonded channel.

The RL-SIG field 332 may indicate to an HE-compatible STA 104 that the PPDU is an HE PPDU. An AP 102 may use the HE-SIG-A field 334 to indicate to multiple identified STAs 104 that the AP has scheduled UL or DL resources. The HE-SIG-A field 334 may be decoded by each HE-compatible STA 104 served by the AP 102. The HE-SIG-A field 334 includes information usable by the identified STAs 104 to decode associated HE-SIG-B fields 336. For example, the HE-SIG-A field 334 may indicate the frame format, including locations and lengths of HE-SIG-B fields 336, available channel bandwidths, modulation and coding schemes (MCS), among other possibilities. The HE-SIG-A field 334 also may include HE WLAN signaling information usable by STAs 104 other than the number of identified STAs 104.

The HE-SIG-B fields 336 carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B field 336 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, the number of users in allocations, among other possibilities. The common field may be encoded with common bits, cyclic redundancy check (CRC) bits, and tail bits. The user-specific fields are assigned to particular STAs 104 and used to schedule specific RUs and to indicate the scheduling to other WLAN devices. Each user-specific field may include multiple user block fields (which may be followed by padding). Each user block field may include two user fields that contain information for two STAs to decode their respective RU payloads.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number of spatial streams (described below). The spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number of separate, independent spatial data streams. The spatial data streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number of spatial data streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number of spatial data streams is less than the number $N_{Tx}$ of transmit antennas, the spatial data streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

As described above, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 4:
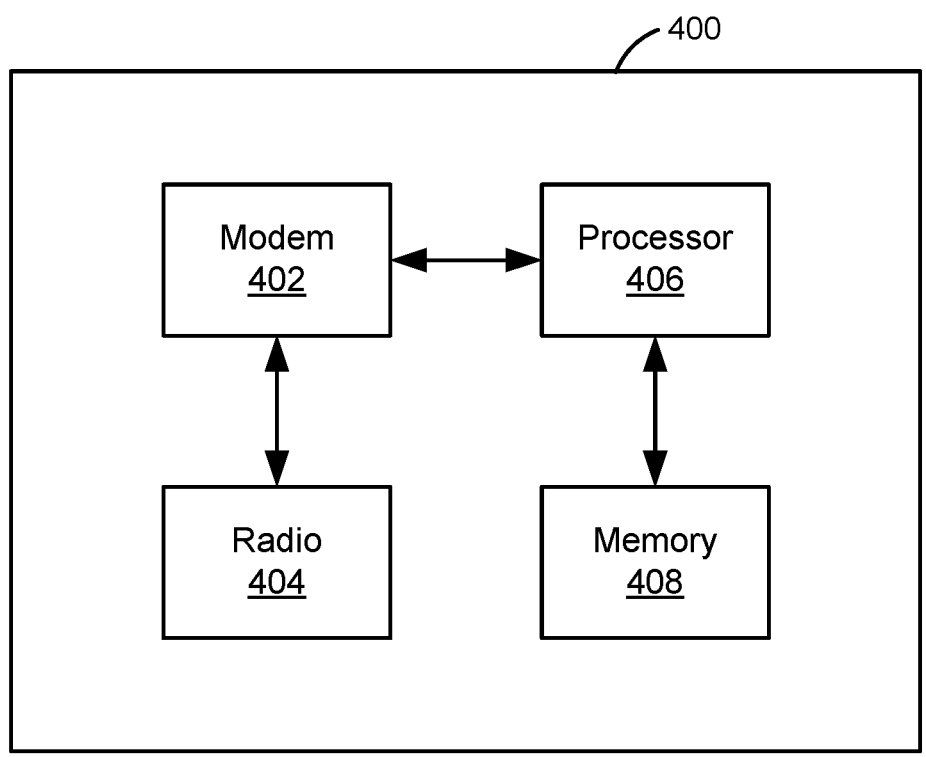
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and Media Access Control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
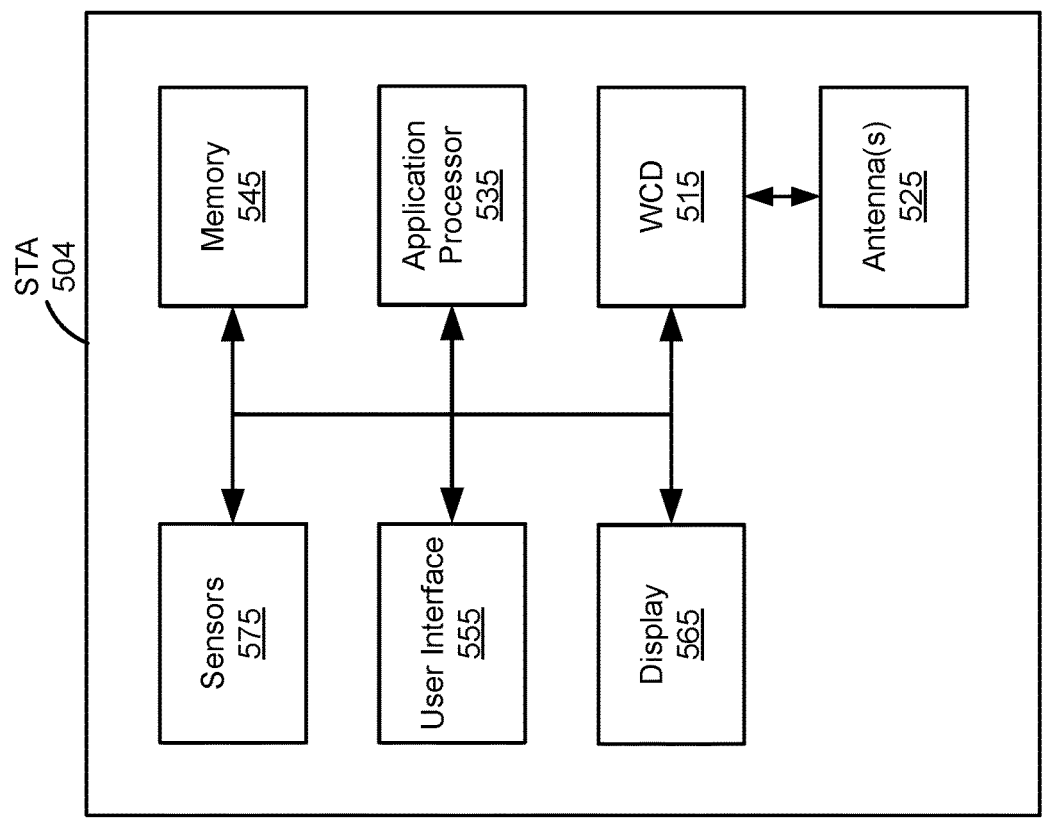
FIG. 5B shows a block diagram of an example station (STA).
Figure 5A:
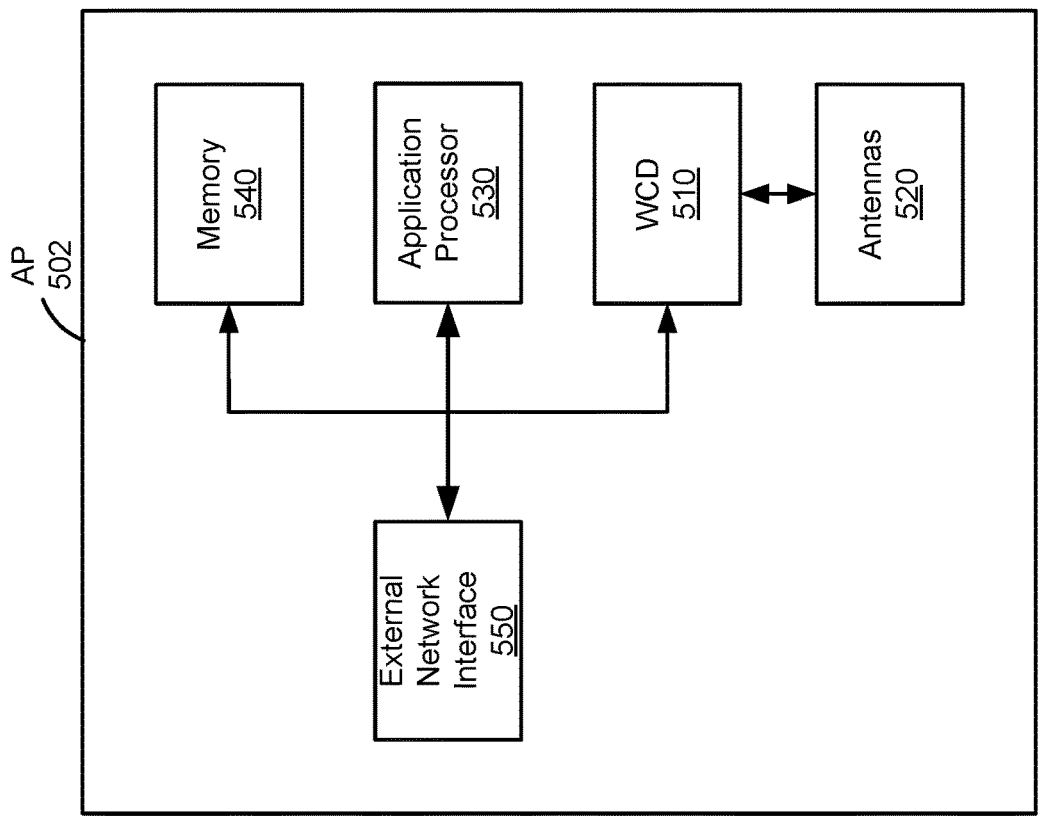
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510. For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515. For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, to obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Rx} \times N_{SS}$ sub-channels in which $N_{Rx}$ is the number of receive antennas and $N_{SS}$ is the number of spatial streams for which the sounding operation is performed. Typically, the number $N_{SS}$ of spatial streams is equal to the number $N_{Tx}$ of transmit antennas. The beamformee generates a feedback matrix based on the channel measurements and, typically, compresses the feedback matrix before transmitting the channel feedback information to the beamformer. The beamformer may then generate a precoding (or "steering") matrix for the beamformee based on the feedback and use the steering matrix to precode the data streams to configure the amplitudes and phase shifts for subsequent transmissions to the beamformee.

As wireless communication techniques advance, it is becoming desirable to increase the number of transmit antennas and thus the number of possible spatial streams, for example, to achieve gains in beamforming. However, the size of a sounding signal, such as an NDP, increases linearly with the number of spatial streams because, for example, the NDP typically includes as many LTFs as there are spatial streams. Additionally, the size of the channel feedback information, for example, in the form of a compressed beamforming feedback (CBF) report, increases linearly with the number of spatial streams. Furthermore, the complexity involved with generating the channel feedback information increases significantly with the number of spatial streams due to, for example, the complex eigenvalue decomposition (for example, singular value decomposition (SVD)) processing required for the larger size of the channel estimate matrix generated when providing feedback for larger numbers of spatial streams. Correspondingly, larger memory buffers are also typically required to enable the complex processing. In some examples described below, the beamformer may have sixteen transmit antennas and be capable of supporting sixteen spatial streams, but the beamformee may be capable of performing the necessary eigenvalue decomposition on only, for example, eight spatial streams. As such, a need exists for a beamformee to generate channel feedback information for, for example, sixteen or more spatial streams while being configured to perform eigenvalue decomposition on only, for example, eight or fewer spatial streams.

Various implementations relate generally to providing channel feedback for multiple spatial streams. Some implementations more specifically relate to techniques for reducing the receiver-side complexity and processing involved with generating channel feedback as part of a sounding operation. In some implementations, the techniques involve generating distinct channel estimates for different respective sets of orthogonal spatial streams. In some implementations, the orthogonality of the different sets of orthogonal spatial streams enables the beamformee to distinguish the spatial streams to provide the separate channel estimates. The beamformee may then determine separate receive antenna correlation matrices for the different respective sets of spatial streams. In some implementations, the beamformee combines the receive antenna correlation matrices to determine an average correlation for each of a number of sets of frequency tones. The beamformee may then perform an eigenvalue decomposition on a tone-by-tone basis based on the respective average correlation and the channel estimate obtained for the tone. Because the eigenvalue decomposition may be performed on each of the two sets of spatial streams separately, the complexity involved with performing each eigenvalue decomposition is greatly reduced.

Particular implementations of the subject matter described in this disclosure can be implemented to realize one or more of the following potential advantages. In some implementations, the described techniques can be used to achieve gains in beamforming by providing channel feedback for a large number, for example sixteen or more, transmit antennas and corresponding spatial streams transmitted by a beamformer. In some implementations, a beamformee is able to provide feedback for, for example, twice as many spatial streams as it would be able to do conventionally due to, for example, the complex eigenvalue decomposition (for example, singular value decomposition (SVD)) processing required for the larger channel estimates generated when providing feedback for larger numbers of spatial streams. In some specific examples, a beamformee is capable of generating channel feedback information for, for example, sixteen or more spatial streams while being configured to perform eigenvalue decomposition on only, for example, eight or fewer spatial streams. However, the techniques described can be applied to even greater numbers of transmit antennas and associated spatial streams.

Figure 6:
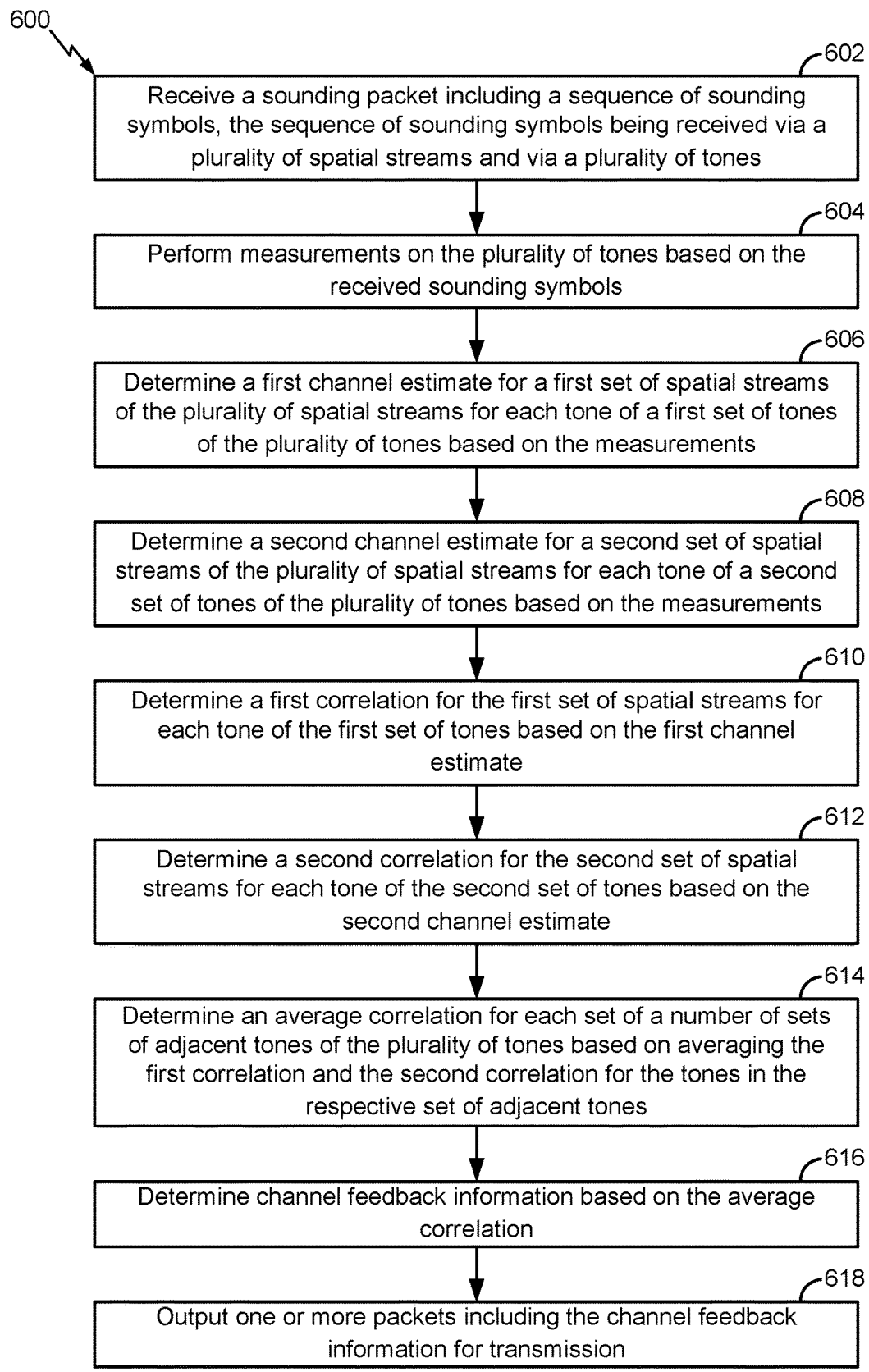
FIG. 6 shows a flowchart illustrating an example process for providing channel feedback information according to some implementations.

FIG. 6 shows a flowchart illustrating an example process 600 for providing channel feedback information according to some implementations. The process 600 may be performed by a first wireless communication device such as the wireless communication device 400 described above with reference to FIG. 4. In some implementations, the process 600 may be performed by a wireless communication device operating as or within a STA functioning as a beamformee, such as one of the STAs 104 and 504 described above with reference to FIGS. 1 and 5B, respectively. In some implementations, the process 600 begins in block 602 with receiving, from a second wireless communication device, a sounding packet. For example, the second wireless communication device may be an AP functioning as a beamformer, such as the AP 102 or AP 502 described above with references to FIGS. 1 and 5A, respectively, that transmits the sounding packet as part of performing a sounding operation in advance of a data transmission operation.

The sounding packet includes a sequence of sounding symbols (for example, OFDM symbols) received via $N_{SS}$ spatial sounding streams (also referred to simply as "spatial streams" or "sounding streams") and via multiple frequency tones (also referred to as "subcarrier frequencies") spaced along a bandwidth of a wireless communication channel. The multiple spatial streams include multiple sets of non-overlapping spatial streams, for example, a first set of spatial streams and a second set of spatial streams. For example, each of the first and the second sets of spatial streams can consist of $N_{SS}/2$ different ones of the $N_{SS}$ spatial streams. In some aspects, each of the first set of spatial streams is transmitted by the second wireless communication device via a respective one of a first set of transmit antennas of the second wireless communication device, and each of the second set of spatial streams is transmitted via a respective one of a second set of transmit antennas of the second wireless communication device.

For example, the second wireless communication device may perform the sounding operation using sixteen transmit antennas to transmit sixteen spatial streams (although, in other examples, the second wireless communication device may include more than or fewer than sixteen antennas to transmit a respective number of spatial streams). In some such examples, the first wireless communication device may perform the sounding operation using two receive antennas (although, in other examples, the first wireless communication device may include one, two or more receive antennas). In this example, each spatial stream in the first set of spatial streams may be transmitted on a respective one of a first set of eight transmit antennas and received on each of the two receive antennas. Similarly, each spatial stream in the second set of spatial streams may be transmitted on a respective one of a second set of eight antennas and received on each of the two receive antennas.

The sounding packet may be transmitted in the form of a null data packet (NDP) that includes a sequence of LTFs. Each of the symbols in the sequence of symbols carries a respective one of the LTFs. Each tone carries one value of the LTF sequence. For example, in a 20 MHz channel including 242 data tones, each LTF symbol may include a 242 BPSK symbol sequence, with one value of the sequence for each of the 242 occupied tones. The first wireless communication device may, prior to receiving the NDP, receive an NDP announcement (NDPA) that indicates the upcoming NDP. In some implementations, one or both of the NDPA or the NDP also indicates the number (the numerical quantity) $N_{SS1}$ of spatial streams in the first set of spatial streams, the number (the numerical quantity) $N_{SS2}$ of spatial streams in the second set of spatial streams, or the total number (the numerical quantity) $N_{SS}$ of spatial streams in the multiple sets of spatial streams. Based on one or more of these numbers, the first wireless communication device is able to determine how many spatial streams to provide feedback for and, accordingly, how to acquire the channel feedback information for the spatial streams.

In block 604, the process 600 proceeds with performing measurements on the plurality of tones based on the received sounding symbols. In some implementations, the performance of the measurements in block 604 includes capturing samples of the signals on each of the tones during the received symbols. In block 606, the process 600 proceeds with determining a first channel estimate $H_{Ak}$ for the first set of spatial streams for each tone k of a first set of tones of the plurality of tones based on the measurements. In block 608, which may be performed concurrently with some or all of block 606, the process proceeds with determining a second channel estimate $H_{Bk}$ for the second set of spatial streams for each tone k of a second set of tones of the plurality of tones based on the measurements.

Continuing the example above, the second wireless communication device may perform the sounding operation using sixteen transmit antennas and the first wireless communication device may perform the sounding operation using two receive antennas. In this example, shown in part in Equations (1) and (2), each of the first channel estimate $H_{Ak}$ and the second channel estimate $H_{Bk}$ may be a 2×8 matrix with each element representing a subchannel between a receive antenna of the first wireless communication device and a respective spatial stream transmitted by the second wireless communication device.

$$H_{Ak} = \begin{bmatrix} h_{k1,1} & h_{k1,2} & h_{k1,3} & h_{k1,4} & h_{k1,5} & h_{k1,6} & h_{k1,7} & h_{k1,8} \\ h_{k2,1} & h_{k2,2} & h_{k2,3} & h_{k2,4} & h_{k2,5} & h_{k2,6} & h_{k2,7} & h_{k2,8} \end{bmatrix} \quad (1)$$

$$H_{Bk} = \begin{bmatrix} h_{k1,9} & h_{k1,10} & h_{k1,11} & h_{k1,12} & h_{k1,13} & h_{k1,14} & h_{k1,15} & h_{k1,16} \\ h_{k2,9} & h_{k2,10} & h_{k2,11} & h_{k2,12} & h_{k2,13} & h_{k2,14} & h_{k2,15} & h_{k2,16} \end{bmatrix} \quad (2)$$

In block 610, the process 600 proceeds with determining a first correlation for the first set of spatial streams for each tone k of the first set of tones based on the first channel estimate $H_{Ak}$. In some implementations, the determination of the first correlation in block 610 consists of or includes determining a first correlation matrix $R_{Ak}$ for each tone k of the first set of tones based on multiplying the first channel estimate $H_{Ak}$ by its conjugate transpose $H_{Ak}^H$ as shown in Equation (3). In block 612, which may be performed concurrently with some or all of block 610, the process proceeds with determining a second correlation for the second set of spatial streams for each tone k of the second set of tones based on the second channel estimate $H_{Bk}$. In some implementations, the determination of the second correlation in block 612 consists of or includes determining a second correlation matrix $R_{Bk}$ for each tone k of the second set of tones based on multiplying the second channel estimate $H_{Bk}$ by its conjugate transpose $H_{Bk}^H$ as shown in Equation (4).

$$R_{Ak} = H_{Ak} H_{Ak}^H \quad (3)$$

$$R_{Bk} = H_{Bk}^H H_{Bk}^H \quad (4)$$

In block 614, the process 600 proceeds with determining an average correlation, for example, in the form of an average correlation matrix $\overline{R}_s$, for each set s of a number of sets of adjacent tones of the plurality of tones based on averaging the first correlation matrix $R_{Ak}$ and the second correlation matrix $R_{Bk}$ for the tones in the respective set of adjacent tones. For example, the first wireless communication device may divide the available tones in the channel into a number of sets of n tones, where, for example, n may be 3, 4, 5, 6 or another suitable integer value. In this way, for example, a first set of adjacent tones may include the first n available tones, the second set of adjacent tones may include the next n available tones, the third set of adjacent tones may include the following n tones, and so on throughout the data tones of the channel. In some other implementations, the average correlation matrix $\overline{R}_s$ may be determined based on a rolling average window, where, for example, the average correlation matrix $\overline{R}_s$ for a given tone is based on the correlation matrices for the given tone and its, for example, two or three neighboring tones on each side.

In block 616, the process 600 proceeds with determining channel feedback information based on the average correlation matrix $\overline{R}_s$, and in block 618, with transmitting, or outputting for transmission (for example, via a radio and one or more coupled antennas), one or more packets including the channel feedback information. For example, each of the one or more packets may include a compressed beamforming feedback (CBF) report.

In some aspects, each spatial stream in the first set of spatial streams is orthogonal to each spatial stream in the second set of spatial streams in one or both of time or frequency. Because the first set of spatial streams is orthogonal to the second set of spatial streams, the first wireless communication device is able to distinguish the first and the second sets of spatial streams from one another and to subsequently determine two separate respective channel estimates based on only half the number of sounding symbols that would generally be required in a typical sounding operation. In some aspects, the first and the second sets of tones do not share any tones and the first set of tones is interleaved in frequency with the second set of tones. In some implementations, the tones in the first set of tones and the tones in the second set of tones alternate along a bandwidth of the channel. Because the channel may be at least partially coherent, the channel doesn't change significantly between individual pairs of adjacent tones. In some such implementations, the first set of spatial streams is transmitted and received on only the first set of tones, and the second set of spatial streams is transmitted and received on only the second set of tones. This division of the tones enables the first wireless communication device to distinguish the first set of spatial streams from the second set of spatial streams so that it may determine the first and the second channel estimates separately in blocks 606 and 608.

In some other implementations, each spatial stream in the first and the second sets of spatial streams is transmitted and received on each tone of both the first and the second sets of tones. For example, this may be possible where each spatial stream in the first set of spatial streams is orthogonal in frequency with each spatial stream in the second set of spatial streams. This orthogonalization of the tones in frequency enables the first wireless communication device to distinguish the first set of spatial streams from the second set of spatial streams so that it may determine the first and the second channel estimates separately in blocks 606 and 608. In some such implementations, the process 600 may further include deorthogonalizing the received spatial streams in frequency prior to performing the measurements in 604. For example, the deorthogonalization of the received spatial streams in frequency may include applying an inverse P matrix to the received sequence of sounding symbols.

In some implementations, each spatial stream in the first set of spatial streams is orthogonal in time with each of the other spatial streams in the first set of spatial streams, and, similarly, each spatial stream in the second set of spatial streams is orthogonal in time with each of the other spatial streams in the second set of spatial streams. This orthogonality further enables the first wireless communication device to distinguish the spatial streams in the first set of spatial streams from one another, and to distinguish the spatial streams in the second set of spatial streams from one another. In some such implementations, the process 600 may further include deorthogonalizing the received spatial streams in time prior to performing the measurements. For example, the deorthogonalization of the received spatial streams in time may include applying an inverse P matrix to the received sequence of sounding symbols.

Figure 7:
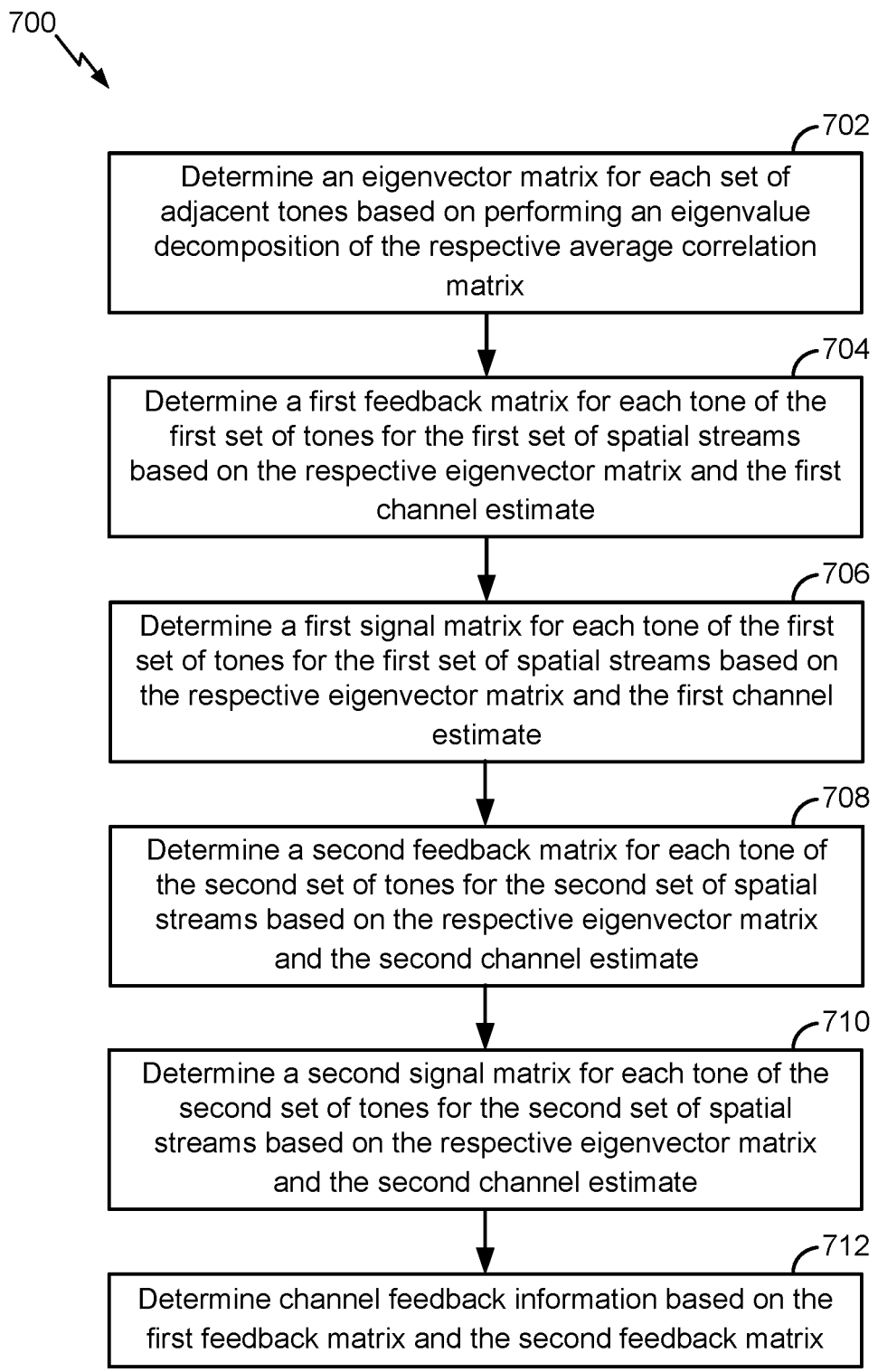
FIG. 7 shows a flowchart illustrating an example process for determining channel feedback information according to some implementations.

FIG. 7 shows a flowchart illustrating an example process 700 for determining channel feedback information according to some implementations. The process 700 may be performed by a wireless communication device such as the wireless communication device 400 described above with reference to FIG. 4. In some implementations, the process 700 may be performed by a wireless communication device operating as or within a STA functioning as a beamformee, such as one of the STAs 104 and 504 described above with reference to FIGS. 1 and 5B, respectively. For example, the process 700 may be an example implementation of block 616 of the process 600 described with reference to FIG. 6.

In some implementations, the process 700 begins in block 702 with determining an eigenvector matrix $U_s$ for each set s of the multiple sets of adjacent tones based on performing an eigenvalue decomposition of the respective average correlation matrix $\overline{R}_s$. For example, the eigenvalue decomposition performed in block 702 can consist of or include performing a principle component analysis (PCA) as shown in Equation (5). The use of PCA to perform the eigenvalue composition may be possible because each of the first and the second correlation matrices $R_{Ak}$ and $R_{Bk}$ is symmetric in some implementations, and thus, the average correlation matrix $\overline{R}_s$ also is symmetric.

$$\overline{R}_s = U_s \Lambda_s U_s^H \quad (5)$$

In block 704, the process 700 proceeds with determining a first feedback matrix $V_{Ak}$ for each tone k of the first set of tones for the first set of spatial streams based on the respective eigenvector matrix $U_s$ and the first channel estimate $H_{Ak}$. For example, the determination of the first feedback matrix $V_{Ak}$ in block 704 may be based on multiplying the conjugate transpose of the respective eigenvector matrix $U_s$ and the first channel estimate $H_{Ak}$ for the respective tone. In block 706, which may be performed concurrently with some or all of block 704, the process proceeds with determining a first signal matrix $S_{Ak}$ for each tone k for the first set of spatial streams based on the respective eigenvector matrix $U_s$ and the first channel estimate $H_{Ak}$. For example, the first wireless communication device may determine the first signal matrix $S_{Ak}$ concurrently with the first feedback matrix $V_{Ak}$ based on the multiplication of the conjugate transpose of the respective eigenvector matrix $U_s$ and the first channel estimate $H_{Ak}$ for the respective tone as shown in Equation (6) (where $V_{Ak}^H$ represents the conjugate transpose of $V_{Ak}$). In some implementations, the performance of blocks 704 and 706 includes determining eigenvalues of the first signal matrix $S_{Ak}$ in such a way as to normalize the power associated with respective eigenvectors of the first feedback matrix $V_{Ak}$.

$$S_{Ak} V_{Ak}^H = U_s^H H_{Ak} \quad (6)$$

In block 708, which may be performed concurrently with some or all of blocks 704 and 706, the process 700 proceeds with determining a second feedback matrix $V_{Bk}$ for each tone k of the second set of tones for the second set of spatial streams based on the respective eigenvector matrix $U_s$ and the second channel estimate $H_{Bk}$. For example, the determination of the second feedback matrix $V_{Bk}$ in block 708 may be based on multiplying the conjugate transpose of the respective eigenvector matrix $U_s$ and the second channel estimate $H_{Bk}$ for the respective tone. In block 710, which may be performed concurrently with some or all of blocks 704, 706 and 708, the process proceeds with determining a second signal matrix $S_{Bk}$ for each tone k for the second set of spatial streams based on the respective eigenvector matrix $U_s$ and the second channel estimate $H_{Bk}$. For example, the first wireless communication device may determine the second signal matrix $S_{Bk}$ concurrently with the second feedback matrix $V_{Bk}$ based on the multiplication of the conjugate transpose of the respective eigenvector matrix $U_s$ and the second channel estimate $H_{Bk}$ for the respective tone as shown in Equation (7) (where $V_{Bk}^H$ represents the conjugate transpose of $V_{Bk}$). In some implementations, the performance of blocks 708 and 710 includes determining eigenvalues of the second signal matrix $S_{Bk}$ in such a way as to normalize the power associated with respective eigenvectors of the second feedback matrix $V_{Bk}$.

$$S_{Bk} V_{Bk}^H = U_s H_{Bk} \quad (7)$$

In block 712, the process proceeds with determining the channel feedback information for each tone k of the plurality of tones based on the first feedback matrix $V_{Ak}$ and the second feedback matrix $V_{Bk}$. In some implementations, the first wireless communication devices additionally compresses the channel feedback information in block 712 prior to transmission to the second wireless communication device. In some implementations, the compression of the channel feedback information in block 712 includes determining a first set of angles $\varphi_{Ak}$ and a second set of angles $\psi_{Ak}$ for each tone k of the first set of tones for the first set of spatial streams based on performing a Givens rotation operation on the eigenvectors of the first feedback matrix $V_{Ak}$. Similarly, the determination of the channel feedback information in block 712 also includes determining a first set of angles $\varphi_{Bk}$ and a second set of angles $\psi_{Bk}$ for each tone k of the second set of tones for the second set of spatial streams based on performing a Givens rotation operation on the eigenvectors of the second feedback matrix $V_{Bk}$. The first sets of angles $\varphi_{Ak}$ and $\varphi_{Bk}$ may represent the relative phase differences between components of the first and the second feedback matrices $V_{Ak}$ and $V_{Bk}$, respectively, and the second sets of angles $\psi_{Ak}$ and $\psi_{Bk}$ represent the relative amplitudes between the components of the first and the second feedback matrices $V_{Ak}$ and $V_{Bk}$, respectively. The performance of the Givens rotation operations also serves to orthogonalize the eigenvectors.

In some such implementations, the determination of the compressed feedback information in block 712 additionally includes quantizing the first set of angles $\varphi_{Ak}$ and quantizing the second set of angles $\psi_{Ak}$ for the first set of spatial streams, and determining second compressed feedback information for the second set of spatial streams based on quantizing the first set of angles $\varphi_{Bk}$ and quantizing the second set of angles $\psi_{Bk}$ for the second set of spatial streams. The first wireless communication device may then transmit, or output for transmission, (for example, via a radio and one or more coupled antennas) the first compressed feedback information and the second compressed feedback information for transmission to the second wireless communications in separate first and second feedback packets. Alternatively, the first wireless communication device may transmit a single feedback packet that includes the first and the second compressed feedback information.

In some other implementations, the determination of the compressed feedback information in block 712 includes determining a combined feedback matrix $V_k$ based on combining the first feedback matrix $V_{Ak}$ and the second feedback matrix $V_{Bk}$. The first wireless communication device may then determine a first set of angles $\varphi_k$ and a second set of angles $\psi_k$ for the plurality of spatial streams based on performing a Givens rotation operation on the eigenvectors of the combined feedback matrix $V_k$. The first wireless communication device may then quantize the first set of angles $\varphi_k$ and the second set of angles $\psi_k$ to generate the compressed feedback information.

In some implementations, the process 700 further includes determining signal-to-noise ratio (SNR) information based on the first signal matrix $S_{Ak}$ and the second signal matrix $S_{Bk}$. The first wireless communication device may transmit, or output for transmission, the SNR information in the one or more packets that include the channel feedback information. In some implementations, the determination of the SNR information includes determining first SNR information for the first set of spatial streams based on the first signal matrix $S_{Ak}$, and determining second SNR information for the second set of spatial streams based on the second signal matrix $S_{Bk}$. In some such implementations, the first SNR information is transmitted with the first feedback information, and the second SNR information is transmitted with the second feedback information. In some other implementations, the first SNR information may be combined with the second SNR information. In some such implementations, the SNR information comprises an average SNR over all tones of the plurality of tones. Additionally, in MU-MIMO implementations, the SNR information may further include, for each tone of the plurality of tones, a deviation of the respective SNR for the tone relative to the average SNR.

Figure 8:
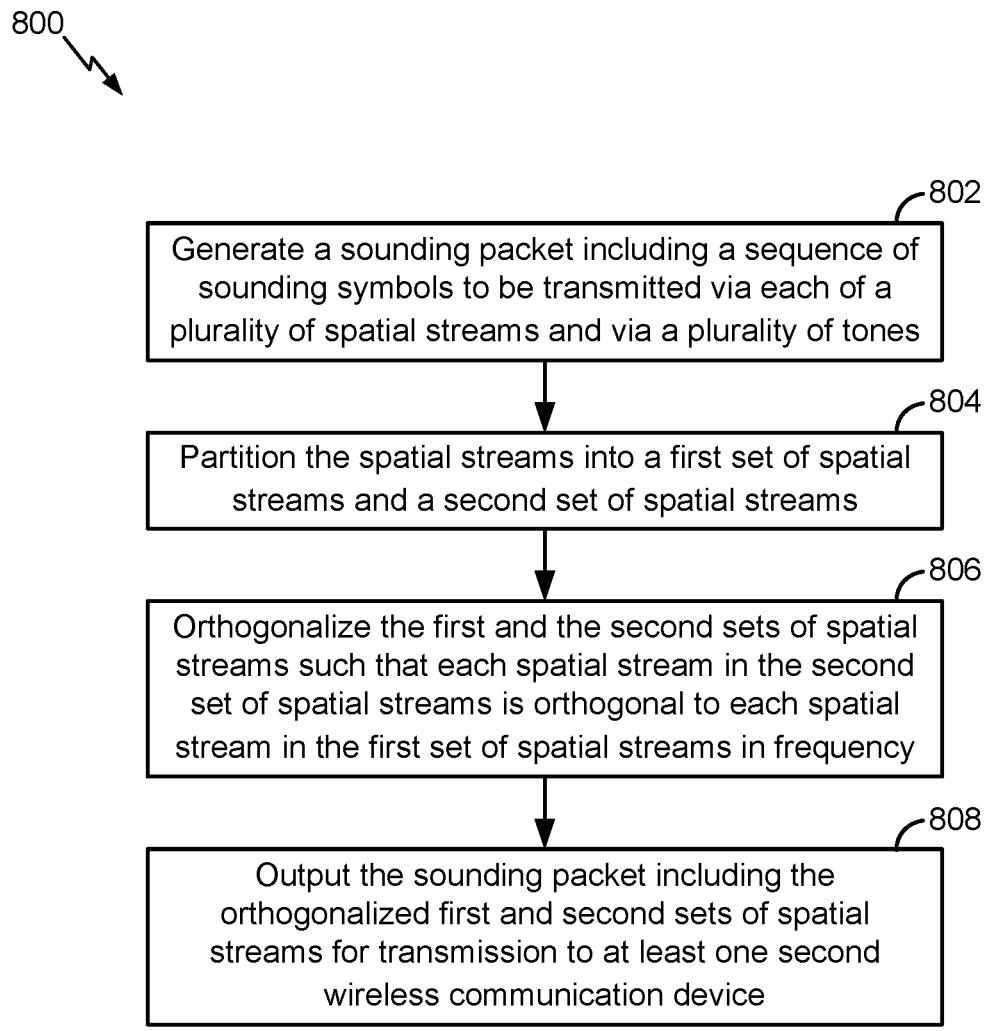
FIG. 8 shows a flowchart illustrating an example process for performing a sounding operation according to some implementations.

FIG. 8 shows a flowchart illustrating an example process 800 for performing a sounding operation according to some implementations. The process 800 may be performed by a wireless communication device such as the wireless communication device 400 described above with reference to FIG. 4. In some implementations, the process 800 may be performed by a wireless communication device operating as or within an AP functioning as a beamformer, such as one of the APs 102 and 502 described above with reference to FIGS. 1 and 5A, respectively. In some implementations, the process 800 begins in block 802 with generating a sounding packet including a sequence of sounding symbols to be transmitted via each of a plurality of spatial streams and via a plurality of tones.

The process 800 proceeds in block 804 with partitioning the spatial streams into a first set of spatial streams and a second set of spatial streams. The plurality of spatial streams can include $N_{SS}$ spatial streams including multiple sets of non-overlapping spatial streams, for example, a first set of spatial streams and a second set of spatial streams. For example, each of the first and the second sets of spatial streams can consist of $N_{SS}/2$ different ones of the $N_{SS}$ spatial streams.

The sounding packet may be generated in the form of an NDP that includes a sequence of LTFs. Each of the symbols in the sequence of symbols carries a respective one of the LTFs. In such instances, the first wireless communication device may, prior to transmitting the NDP, transmit, or output for transmission, an NDPA that indicates the upcoming NDP. In some implementations, one or both of the NDPA or the NDP also indicates the number (the numerical quantity) $N_{SS1}$ of spatial streams in the first set of spatial streams, the number (the numerical quantity) $N_{SS2}$ of spatial streams in the second set of spatial streams, or the total number (the numerical quantity) $N_{SS}$ of spatial streams in the multiple sets of spatial streams.

In some implementations, the process 800 proceeds in block 806 with orthogonalizing the first and the second sets of spatial streams such that each spatial stream in the second set of spatial streams is orthogonal to each spatial stream in the first set of spatial streams in one or both of time or frequency. Because the first set of spatial streams is orthogonal to the second set of spatial streams, a second wireless communication device (for example, a STA such as one of the STAs 104 or 504 described with reference to FIGS. 1 and 5B, respectively) receiving the sounding packet is able to distinguish the first and the second sets of spatial streams from one another and to subsequently determine two separate respective channel estimates based on only half the number of sounding symbols that would generally be required in a typical sounding operation.

In some implementations, the process 800 proceeds in block 808 with transmitting, or outputting for transmission (for example, via a radio and a plurality of coupled transmit antennas), the sounding packet including the orthogonalized first and second sets of spatial streams to at least one second wireless communication device. The first wireless communication device may map each spatial stream in the first set of spatial streams to a corresponding one of a first set of transmit antennas for transmission on the respective antenna, and may map each spatial stream in the second set of spatial streams to a corresponding one of a second set of transmit antennas for transmission on the respective antenna. For example, the first wireless communication device may perform the sounding operation using sixteen transmit antennas to transmit sixteen spatial streams (although, in other examples, the second wireless communication device may include more than or fewer than sixteen antennas to transmit a respective number of spatial streams). In this example, each spatial stream in the first set of spatial streams may be transmitted on a respective one of a first set of eight transmit antennas. Similarly, each spatial stream in the second set of spatial streams may be transmitted on a respective one of a second set of eight antennas.

Figure 9:
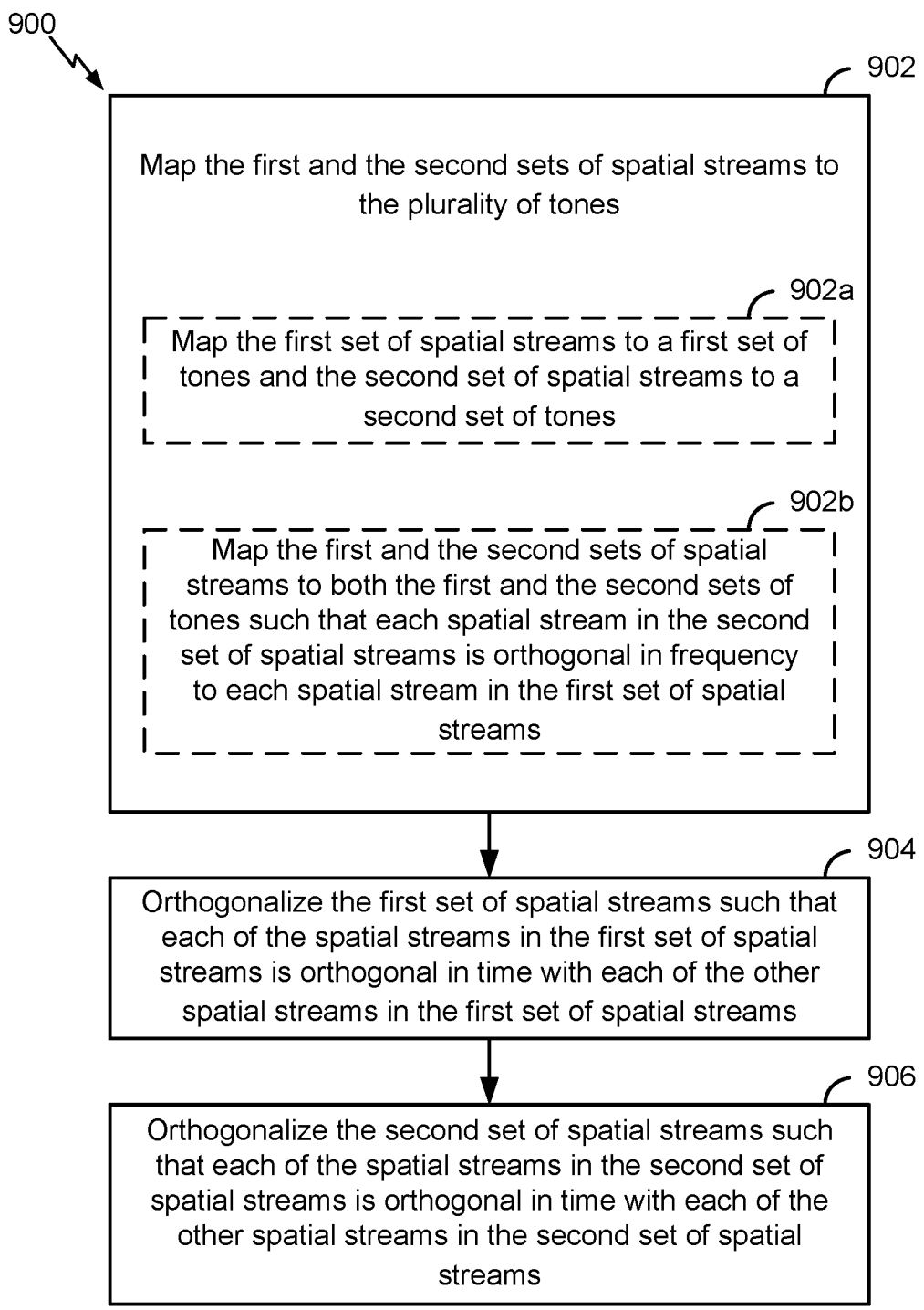
FIG. 9 shows a flowchart illustrating an example process for orthogonalizing spatial streams for a sounding operation according to some implementations.

FIG. 9 shows a flowchart illustrating an example process 900 for orthogonalizing spatial streams for a sounding operation according to some implementations. The process 900 may be performed by a wireless communication device such as the wireless communication device 400 described above with reference to FIG. 4. In some implementations, the process 900 may be performed by a wireless communication device operating as or within an AP functioning as a beamformer, such as one of the APs 102 and 502 described above with reference to FIGS. 1 and 5A, respectively. For example, the process 900 may be an example implementation of block 806 of the process 800 described with reference to FIG. 8.

In some implementations, the process 900 begins in block 902 with mapping the first and the second sets of spatial streams to the plurality of tones. In some such implementations, the mapping in block 902 includes mapping, in block 902a, the first set of spatial streams to a first set of tones and mapping the second set of spatial streams to a second set of tones that does not share any tones with the first set of tones. The first set of tones may be interleaved in frequency with the second set of tones. For example, the tones in the first set of tones and the tones in the second set of tones may alternate along a bandwidth of the channel. In some other implementations, the mapping in block 902 includes mapping, in block 902*b*, the first and the second sets of spatial streams to both the first and the second sets of tones such that each spatial stream in the second set of spatial streams is orthogonal in frequency to each spatial stream in the first set of spatial streams. For example, the first wireless communication device may apply a P matrix to the sequence of sounding symbols to map the first and the second sets of spatial streams to the plurality of tones such that each spatial stream in the second set of spatial streams is orthogonal in frequency to each spatial stream in the first set of spatial streams.

In blocks 904 and 906, which may be performed concurrently with some or all of one another or block 902, the process 900 proceeds with orthogonalizing the first set of spatial streams such that each spatial stream in the first set of spatial streams is orthogonal in time with each of the other spatial streams in the first set of spatial streams, and orthogonalizing the second set of spatial streams such that each spatial stream in the second set of spatial streams is orthogonal in time with each of the other spatial streams in the second set of spatial streams. For example, the first wireless communication device may apply a P matrix to the sequence of sounding symbols such that each spatial stream in the first set of spatial streams is orthogonal in time with each of the other spatial streams in the first set of spatial streams and such that each spatial stream in the second set of spatial streams is orthogonal in time with each of the other spatial streams in the second set of spatial streams. This orthogonalization of the spatial streams in time enables another wireless communication device that receives the sounding packet to distinguish the first set of spatial streams from one another and to distinguish the second set of spatial streams from one another so that it may determine separate channel estimates for both the first and the second sets of spatial streams.

In implementations in which the first set of spatial streams are mapped to only the first set of tones and the second set of spatial streams are mapped to only the second set of tones, the first set of tones may be transmitted via only the first set of antennas and the second set of tones may be transmitted via only the second set of antennas. In other implementations in which a P matrix is used to orthogonalize the first and the second sets of spatial streams in frequency, each of the first and the second sets of tones may be transmitted via each of both the first and the second sets of antennas.

Figure 10:
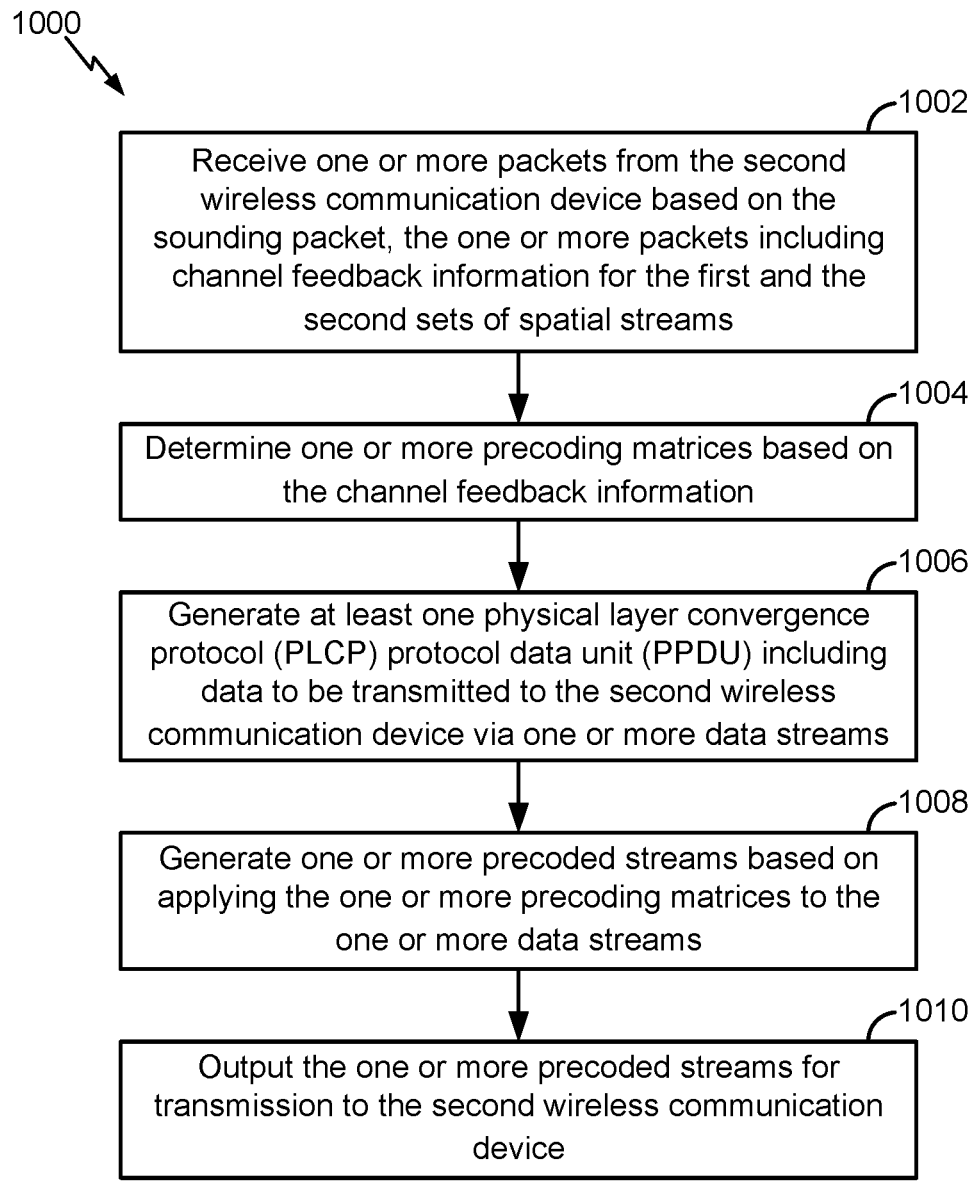
FIG. 10 shows a flowchart illustrating an example process for transmitting data according to some implementations.

FIG. 10 shows a flowchart illustrating an example process 1000 for transmitting data according to some implementations. The process 1000 may be performed by a wireless communication device such as the wireless communication device 400 described above with reference to FIG. 4. In some implementations, the process 1000 may be performed by a wireless communication device operating as or within an AP functioning as a beamformer, such as one of the APs 102 and 502 described above with reference to FIGS. 1 and 5A, respectively. In some implementations, the process 1000 may be performed subsequent to the process 800 described with reference to FIG. 8 as part of a sounding and data transmission operation.

In some implementations, the process 1000 begins in block 1002 with receiving one or more packets from a second wireless communication device based on the sounding packet transmitted in block 808. The one or more packets received in block 1002 include channel feedback information for the first and the second sets of spatial streams used to transmit the sounding packet. For example, each of the one or more packets may include a CBF report. In some implementations, the channel feedback information received in block 1002 may be compressed feedback information and the process 1000 may further include decompressing the compressed feedback information.

In some implementations, the first wireless communication device may receive two or more feedback packets from the second wireless communication device, for example, a first feedback packet including first compressed feedback information for the first set of spatial streams and a second feedback packet including second compressed feedback information for the second set of spatial streams. The first feedback information may include a first set of angles $\varphi_{Ak}$ and a second set of angles $\psi_{Ak}$ for the first set of spatial streams, and the second feedback information may include a first set of angles $\varphi_{Bk}$ and a second set of angles $\psi_{Bk}$ for the second set of spatial streams. Alternatively, the first wireless communication device may receive a single feedback packet from the second wireless communication device that includes the first and the second compressed feedback information. In such instances, the feedback information may include a first set of angles $\varphi_k$ and a second set of angles $\psi_k$ associated with the entire plurality of spatial streams including both the first and the second sets of spatial streams.

In some implementations, the channel feedback information further includes SNR information. For example, the SNR information may include first SNR information received with the first feedback information in a first feedback packet, and second SNR information received with the second feedback information in a second feedback packet. In some other implementations, the first SNR information may be combined with the second SNR information and received in a single feedback packet with the rest of the channel feedback information. In some implementations, the SNR information comprises an average SNR over all tones of the plurality of tones. Additionally, in MU-MIMO implementations, the SNR information may further include, for each tone of the plurality of tones, a deviation of the respective SNR for the tone relative to the average SNR.

In block 1004, the process 1000 proceeds with determining one or more precoding matrices based on the channel feedback information. In implementations in which the channel feedback information includes first feedback information for the first set of spatial streams separate from second feedback information for the second set of spatial streams, the generation of the one or more precoding matrices in block 1004 may consist of generating a single precoding matrix based on the first set of angles $\varphi_{Ak}$ and the second set of angles $\psi_{Ak}$ associated with the first set of spatial streams, and also based on the first set of angles $\varphi_{Bk}$ and the second set of angles $\psi_{Bk}$ associated with the second set of spatial streams. In other implementations in which the channel feedback information includes combined feedback information for both the first and the second sets of spatial streams, the generation of the one or more precoding matrices in block 1004 may consist of generating a single precoding matrix based on the first set of angles $\varphi_k$ and the second set of angles $\psi_k$ associated with the combined feedback information.

In block 1006, the process 1000 proceeds with generating at least one PPDU including data to be transmitted to the second wireless communication device via one or more data streams. For example, the first wireless communication device may determine to transmit one or more data streams based on spatial multiplexing a single data stream into the one or more data streams (where the number of data streams is limited to being less than or equal to the number of receive antennas of the second wireless communication device). In block 1008, the process 1000 proceeds with generating one or more precoded streams based on applying the one or more precoding matrices determined in block 1004 to the one or more data streams. In block 1010, the process 1000 proceeds with transmitting, or outputting for transmission (for example, via a radio and a plurality of coupled transmit antennas), the one or more precoded streams to the second wireless communication device.

Figure 11:
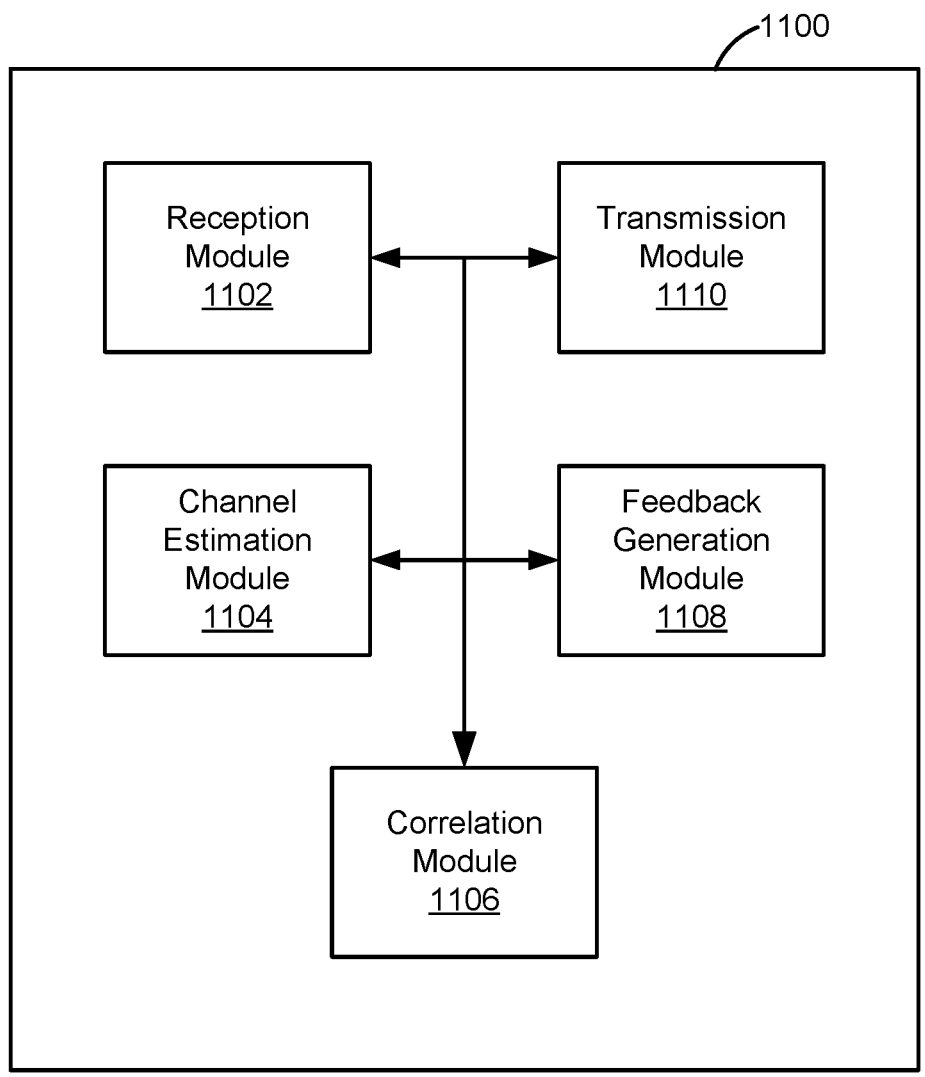
FIG. 11 shows a block diagram of an example wireless communication device for use in wireless communication according to some implementations.

FIG. 11 shows a block diagram of an example wireless communication device 1100 for use in wireless communication according to some implementations. For example, the wireless communication device 1100 is configured to operate as a beamformee. In some implementations, the wireless communication device 1100 is configured to perform one or more of the processes 600 and 700 described above with reference to FIGS. 6 and 7, respectively. The wireless communication device 1100 may be an example implementation of the wireless communication device 400 described above with reference to FIG. 4. For example, the wireless communication device 1100 can be a chip, SoC, chipset, package or device that includes at least one processor and at least one modem (for example, a Wi-Fi (IEEE 802.11) modem or a cellular modem). In some implementations, the wireless communication device 1100 can be a device for use in a STA, such as one of the STAs 104 and 504 described above with reference to FIGS. 1 and 5B, respectively. In some other implementations, the wireless communication device 1100 can be a STA that includes such a chip, SoC, chipset, package or device as well as at least one transmitter, at least one receiver, and at least one antenna.

The wireless communication device 1100 includes a reception module 1102, a channel estimation module 1104, a correlation module 1106, a feedback generation module 1108 and a transmission module 1110. Portions of one or more of the modules 1102, 1104, 1106, 1108 and 1110 may be implemented at least in part in hardware or firmware. For example, the reception module 1102, channel estimation module 1104, correlation module 1106, feedback generation module 1108 and transmission module 1110 may be implemented at least in part by a modem (such as the modem 402). In some implementations, at least portions of some of the modules 1102, 1104, 1106, 1108 and 1110 may be implemented at least in part as software stored in a memory (such as the memory 408). For example, portions of one or more of the modules 1102, 1104, 1106, 1108 and 1110 can be implemented as non-transitory instructions (or "code") executable by a processor (such as the processor 406) to perform the functions or operations of the respective module.

The reception module 1102 is configured to receive, from a second wireless communication device, a sounding packet. For example, the second wireless communication device may be an AP functioning as a beamformer, such as the AP 102 or AP 502 described above with references to FIGS. 1 and 5A, respectively, that transmits the sounding packet as part of performing a sounding operation in advance of a data transmission operation. The sounding packet includes a sequence of sounding symbols (for example, OFDM symbols) received via $N_{SS}$ spatial sounding streams (also referred to simply as "spatial streams" or "sounding streams") and via multiple frequency tones (also referred to as "subcarrier frequencies") spaced along a bandwidth of a wireless communication channel. The multiple spatial streams include multiple sets of non-overlapping spatial streams, for example, a first set of spatial streams and a second set of spatial streams. For example, each of the first and the second sets of spatial streams can consist of $N_{SS}/2$ different ones of the $N_{SS}$ spatial streams. In some aspects, each of the first set of spatial streams is transmitted by the second wireless communication device via a respective one of a first set of transmit antennas of the second wireless communication device, and each of the second set of spatial streams is transmitted via a respective one of a second set of transmit antennas of the second wireless communication device.

The sounding packet may be transmitted in the form of an NDP that includes a sequence of LTFs. Each of the symbols in the sequence of symbols carries a respective one of the LTFs. Each tone carries one value of the LTF sequence. For example, in a 20 MHz channel including 242 data tones, each LTF symbol may include a 242 BPSK symbol sequence, with one value of the sequence for each of the 242 occupied tones. The reception module 1102 may, prior to receiving the NDP, receive an NDPA that indicates the upcoming NDP. In some implementations, one or both of the NDPA or the NDP also indicates the number (the numerical quantity) $N_{SS1}$ of spatial streams in the first set of spatial streams, the number (the numerical quantity) $N_{SS2}$ of spatial streams in the second set of spatial streams, or the total number (the numerical quantity) $N_{SS}$ of spatial streams in the multiple sets of spatial streams. As described below, the wireless communication device 1100 is able to determine how many spatial streams to provide feedback for and, accordingly, how to acquire the channel feedback information for the spatial streams based on one or more of these numerical indications.

In some aspects, each spatial stream in the first set of spatial streams is orthogonal to each spatial stream in the second set of spatial streams in one or both of time or frequency. In some aspects, the first and the second sets of tones do not share any tones and the first set of tones is interleaved in frequency with the second set of tones. In some implementations, the tones in the first set of tones and the tones in the second set of tones alternate along a bandwidth of the channel. In some such implementations, the first set of spatial streams is transmitted and received on only the first set of tones, and the second set of spatial streams is transmitted and received on only the second set of tones. This division of the tones enables the reception module 1102 to distinguish the first set of spatial streams from the second set of spatial streams so that the channel estimation module 1104 is able to generate two individual channel estimates—one for the first set of spatial streams and one for the second set of spatial streams.

In some other implementations, each spatial stream in the first and the second sets of spatial streams is transmitted and received on each tone of both the first and the second sets of tones. For example, this may be possible where each spatial stream in the first set of spatial streams is orthogonal in frequency with each spatial stream in the second set of spatial streams. This orthogonalization of the tones in frequency enables the reception model 1102 to distinguish the first set of spatial streams from the second set of spatial streams so that the channel estimation module 1104 may determine the two channel estimates separately. In some such implementations, the reception module 1102 is further configured to deorthogonalize the received spatial streams in frequency. For example, the deorthogonalization of the received spatial streams in frequency may include applying an inverse P matrix to the received sequence of sounding symbols.

In some implementations, each spatial stream in the first set of spatial streams is orthogonal in time with each of the other spatial streams in the first set of spatial streams, and, similarly, each spatial stream in the second set of spatial streams is orthogonal in time with each of the other spatial streams in the second set of spatial streams. This orthogonality further enables the reception module 1102 to distinguish the spatial streams in the first set of spatial streams from one another, and to distinguish the spatial streams in the second set of spatial streams from one another. As such, the reception module 1102 may further be configured to deorthogonalize the received spatial streams in time. For example, the deorthogonalization of the received spatial streams in time may include applying an inverse P matrix to the received sequence of sounding symbols.

The channel estimation module 1104 is configured to perform measurements on the plurality of tones based on the received sounding symbols. In some implementations, the performance of the measurements includes capturing samples of the signals on each of the tones during the received symbols in the deorthogonalized spatial streams obtained by the reception module 1102. For example, the channel estimation module 1104 may be configured to determine a first channel estimate $H_{Ak}$ for the first set of spatial streams for each tone k of a first set of tones of the plurality of tones based on the measurements. Similarly, the channel estimation module 1104 may be configured to determine a second channel estimate $H_{Bk}$ for the second set of spatial streams for each tone k of a second set of tones of the plurality of tones based on the measurements.

As described above, in some aspects, the first and second sets of tones do not share any tones and the first set of tones is interleaved in frequency with the second set of tones. In some such implementations, the first set of spatial streams is transmitted and received on only the first set of tones, and the second set of spatial streams is transmitted and received on only the second set of tones. This division of the tones enables the reception model 1102 to distinguish the first set of spatial streams from the second set of spatial streams so that the channel estimation module 1104 can distinguish the first set of spatial streams from the second set of spatial streams so that it may determine the first and the second channel estimates $H_{Ak}$ and $H_{Bk}$ separately. In some other implementations, each spatial stream in the first and the second sets of spatial streams is transmitted and received on each tone of both the first and the second sets of tones. For example, this may be possible where each spatial stream in the first set of spatial streams is orthogonal in frequency with each spatial stream in the second set of spatial streams. Again, this orthogonalization of the tones in frequency enables the reception model 1102 to distinguish the first set of spatial streams from the second set of spatial streams so that the channel estimation module 1104 may determine the two channel estimates separately.

The correlation module 1106 is configured to determine a first correlation for the first set of spatial streams for each tone k of the first set of tones based on the first channel estimate $H_{Ak}$. In some implementations, the determination of the first correlation consists of or includes determining a first correlation matrix $R_{Ak}$ for each tone k of the first set of tones based on multiplying the first channel estimate $H_{Ak}$ by its conjugate transpose $H_{Ak}^H$ as shown in Equation (3). Similarly, the correlation module 1106 is configured to determine a second correlation for the second set of spatial streams for each tone k of the second set of tones based on the second channel estimate $H_{Bk}$. In some implementations, the determination of the second correlation consists of or includes determining a second correlation matrix $R_{Bk}$ for each tone k of the second set of tones based on multiplying the second channel estimate $H_{Bk}$ by its conjugate transpose $H_{Bk}^H$ as shown in Equation (4).

The correlation module 1106 is further configured to determine an average correlation, for example, in the form of an average correlation matrix $\bar{R}_s$, for each set s of a number of sets of adjacent tones of the plurality of tones based on averaging the first correlation matrix $R_{Ak}$ and the second correlation matrix $R_{Bk}$ for the tones in the respective set of adjacent tones. For example, the correlation module 1106 may divide the available tones in the channel into a number of sets of n tones, where, for example, n may be 3, 4, 5, 6 or another suitable integer value. In this way, for example, a first set of adjacent tones may include the first n available tones, the second set of adjacent tones may include the next n available tones, the third set of adjacent tones may include the following n tones, and so on throughout the occupied tones of the channel. In some other implementations, the average correlation matrix $\bar{R}_s$ may be determined based on a rolling average window, where, for example, the average correlation matrix $\bar{R}_s$ for a given tone is based on the correlation matrices for the given tone and its, for example, two or three neighboring tones on each side.

The feedback generation module 1108 is configured to determine channel feedback information based on the average correlation matrix $\bar{R}_s$. In some implementations, the determination of the channel feedback information includes determining an eigenvector matrix $U_s$ for each set s of the multiple sets of adjacent tones based on performing an eigenvalue decomposition of the respective average correlation matrix $\bar{R}_s$. For example, the eigenvalue decomposition can consist of or include performing a PCA as shown in Equation (5).

In some implementations, the feedback generation module 1108 is further configured to determine a first feedback matrix $V_{Ak}$ for each tone k of the first set of tones for the first set of spatial streams based on the respective eigenvector matrix $U_s$ and the first channel estimate $H_{Ak}$. For example, the determination of the first feedback matrix $V_{Ak}$ may be based on multiplying the conjugate transpose of the respective eigenvector matrix $U_s$ and the first channel estimate $H_{Ak}$ for the respective tone. The feedback generation module 1108 may be further configured to determine a first signal matrix $S_{Ak}$ for each tone k for the first set of spatial streams based on the respective eigenvector matrix $U_s$ and the first channel estimate $H_{Ak}$. For example, the feedback generation module 1108 may determine the first signal matrix $S_{Ak}$ concurrently with the first feedback matrix $V_{Ak}$ based on the multiplication of the conjugate transpose of the respective eigenvector matrix $U_s$ and the first channel estimate $H_{Ak}$ for the respective tone as shown in Equation (6). In some implementations, the feedback generation module 1108 determines the eigenvalues of the first signal matrix $S_{Ak}$ in such a way as to normalize the power associated with respective eigenvectors of the first feedback matrix $V_{Ak}$.

Similarly, the feedback generation module 1108 is further configured to determine a second feedback matrix $V_{Bk}$ for each tone k of the second set of tones for the second set of spatial streams based on the respective eigenvector matrix $U_s$ and the second channel estimate $H_{Bk}$. For example, the determination of the second feedback matrix $V_{Bk}$ may be based on multiplying the conjugate transpose of the respective eigenvector matrix $U_s$ and the second channel estimate $H_{Bk}$ for the respective tone. The feedback generation module 1108 may be further configured to determine a second signal matrix $S_{Bk}$ for each tone k for the second set of spatial streams based on the respective eigenvector matrix $U_s$ and the second channel estimate $H_{Bk}$. For example, the feedback generation module 1108 may determine the second signal matrix $S_{Bk}$ concurrently with the second feedback matrix $V_{Bk}$ based on the multiplication of the conjugate transpose of the respective eigenvector matrix $U_s$ and the second channel estimate $H_{Bk}$ for the respective tone as shown in Equation (7). In some implementations, the feedback generation module 1108 determines the eigenvalues of the second signal matrix $S_{Bk}$ in such a way as to normalize the power associated with respective eigenvectors of the second feedback matrix $V_{Bk}$.

The feedback generation module 1108 is configured to determine the channel feedback information for each tone k of the plurality of tones based on the first feedback matrix $V_{Ak}$ and the second feedback matrix $V_{Bk}$. In some implementations, the feedback generation module 1108 is configured to compress the channel feedback information prior to transmission to the second wireless communication device. For example, the feedback generation module 1108 may be configured to determine a first set of angles $\varphi_{Ak}$ and a second set of angles $\psi_{Ak}$ for each tone k of the first set of tones for the first set of spatial streams based on performing a Givens rotation operation on the eigenvectors of the first feedback matrix $V_{Ak}$. Similarly, the feedback generation module 1108 may be configured to determine a first set of angles $\varphi_{Bk}$ and a second set of angles $\psi_{Bk}$ for each tone k of the second set of tones for the second set of spatial streams based on performing a Givens rotation operation on the eigenvectors of the second feedback matrix $V_{Bk}$. The first sets of angles $\varphi_{Ak}$ and $\varphi_{Bk}$ may represent the relative phase differences between components of the first and the second feedback matrices $V_{Ak}$ and $V_{Bk}$, respectively, and the second sets of angles $\psi_{Ak}$ and $\psi_{Bk}$ represent the relative amplitudes between the components of the first and the second feedback matrices $V_{Ak}$ and $V_{Bk}$, respectively. The performance of the Givens rotation operations also serves to orthogonalize the eigenvectors.

In some implementations, the feedback generation module 1108 is further configured to quantize the first set of angles $\varphi_{Ak}$ and the second set of angles $\psi_{Ak}$ for the first set of spatial streams to compress the first feedback information for the first set of spatial streams. Similarly, the feedback generation module 1108 may be further configured to quantize the first set of angles $\varphi_{Bk}$ and the second set of angles $\psi_{Bk}$ for the second set of spatial streams to compress the second feedback information for the second set of spatial streams. In some other implementations, the feedback generation module 1108 may generate the feedback information by first determining a combined feedback matrix $V_k$ based on combining the first feedback matrix $V_{Ak}$ and the second feedback matrix $V_{Bk}$, and then determining a first set of angles $\varphi_k$ and a second set of angles $\psi_k$ for the plurality of spatial streams based on performing a Givens rotation operation on the eigenvectors of the combined feedback matrix $V_k$. The feedback generation module 1108 may then quantize the first set of angles $\varphi_k$ and the second set of angles $\psi_k$ to generate the compressed feedback information.

In some implementations, the feedback generation module 1108 is further configured to determine SNR information based on the first signal matrix $S_{Ak}$ and the second signal matrix $S_{Bk}$. In some such implementations, the SNR information comprises an average SNR over all tones of the plurality of tones. Additionally, in MU-MIMO implementations, the SNR information may further include, for each tone of the plurality of tones, a deviation of the respective SNR for the tone relative to the average SNR.

The transmission module 1110 is configured to transmit, or output for transmission (for example, via a radio and one or more coupled antennas), one or more packets including the channel feedback information. For example, each of the one or more packets may include a CBF report. In some implementations, the transmission module is configured to transmit or output for transmission the first compressed feedback information and the second compressed feedback information for transmission to the second wireless communications in separate first and second feedback packets. Alternatively, the transmission module 1110 may transmit a single feedback packet that includes the first and the second compressed feedback information. In some implementations, the transmission module 1110 may further transmit, or output for transmission, the SNR information in the one or more packets that include the channel feedback information.

Figure 12:
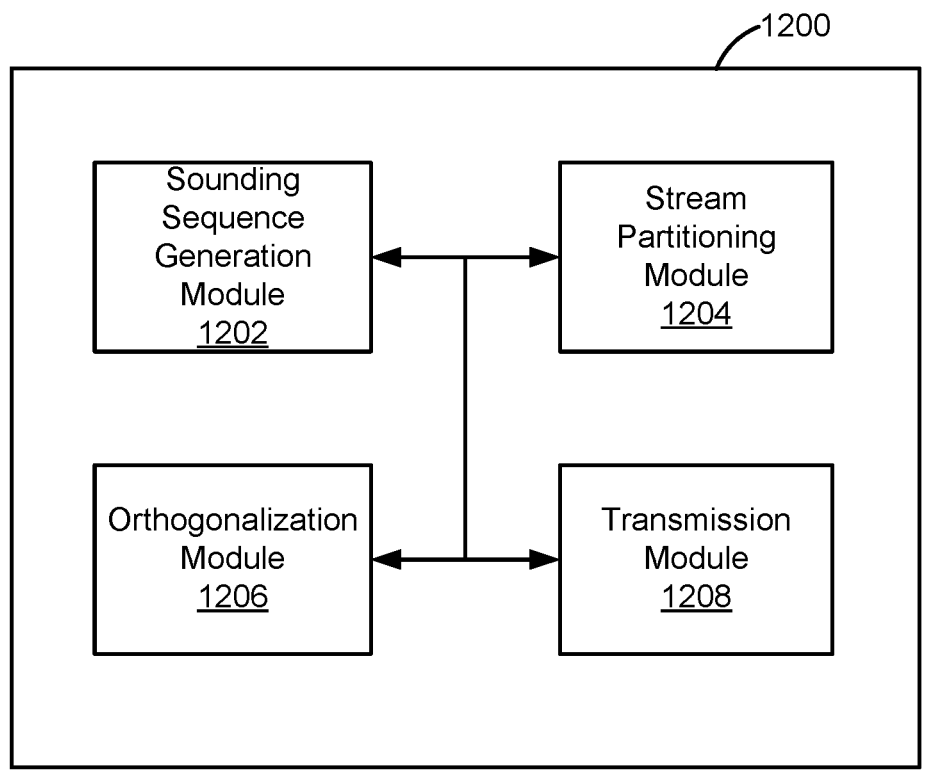
FIG. 12 shows a block diagram of an example wireless communication device for use in wireless communication according to some implementations.

FIG. 12 shows a block diagram of an example wireless communication device 1200 for use in wireless communication according to some implementations. For example, the wireless communication device 1200 is configured to operate as a beamformer. In some implementations, the wireless communication device 1200 is configured to perform one or more of the processes 800, 900 and 1000 described above with reference to FIGS. 8, 9 and 10, respectively. The wireless communication device 1200 may be an example implementation of the wireless communication device 400 described above with reference to FIG. 4. For example, the wireless communication device 1200 can be a chip, SoC, chipset, package or device that includes at least one processor and at least one modem (for example, a Wi-Fi (IEEE 802.12) modem or a cellular modem). In some implementations, the wireless communication device 1200 can be a device for use in an AP, such as one of the APs 102 and 502 described above with reference to FIGS. 1 and 5A, respectively. In some other implementations, the wireless communication device 1200 can be an AP that includes such a chip, SoC, chipset, package or device as well as at least one transmitter, at least one receiver, and at least one antenna.

The wireless communication device 1200 includes a sounding sequence generation module 1202, a stream partitioning module 1204, an orthogonalization module 1206, and a transmission module 1208. Portions of one or more of the modules 1202, 1204, 1206 and 1208 may be implemented at least in part in hardware or firmware. For example, the sounding sequence generation module 1202, stream partitioning module 1204, orthogonalization module 1206, and transmission module 1208 may be implemented at least in part by a modem (such as the modem 402). In some implementations, at least a portion of one or more of the modules 1202, 1204, 1206 and 1208 may be implemented at least in part as software stored in a memory (such as the memory 408). For example, portions of one or more of the modules 1202, 1204, 1206 and 1208 can be implemented as non-transitory instructions (or "code") executable by a processor (such as the processor 406) to perform the functions or operations of the respective module.

The sounding sequence generation module 1202 is configured to generate a sounding packet including a sequence of sounding symbols to be transmitted via each of a plurality of spatial streams and via a plurality of tones. In some implementations, the sounding sequence generation module 1202 generates the sounding packet in the form of an NDP that includes a sequence of LTFs. Each of the symbols in the sequence of symbols carries a respective one of the LTFs.

The stream partitioning module 1204 is configured to provide the plurality of spatial streams based on the sequence of sounding symbols and to partition the spatial streams into a first set of spatial streams and a second set of spatial streams. The plurality of spatial streams can include $N_{SS}$ spatial streams including multiple sets of non-overlapping spatial streams, for example, a first set of spatial streams and a second set of spatial streams. For example, each of the first and the second sets of spatial streams can consist of $N_{SS}/2$ different ones of the $N_{SS}$ spatial streams.

In some implementations, the wireless communication device 1200 may, prior to transmitting the NDP, transmit, or output for transmission, an NDPA that indicates the upcoming NDP. In some implementations, one or both of the NDPA or the NDP also indicates the number (the numerical quantity) $N_{SS1}$ of spatial streams in the first set of spatial streams, the number (the numerical quantity) $N_{SS2}$ of spatial streams in the second set of spatial streams, or the total number (the numerical quantity) $N_{SS}$ of spatial streams in the multiple sets of spatial streams.

The orthogonalization module 1206 is configured to orthogonalize the first and the second sets of spatial streams such that each spatial stream in the second set of spatial streams is orthogonal to each spatial stream in the first set of spatial streams in one or both of time or frequency. If the first set of spatial streams is orthogonal to the second set of spatial streams, a second wireless communication device (for example, a STA such as one of the STAs 104 or 504 described with reference to FIGS. 1 and 5B, respectively) receiving the sounding packet is able to distinguish the first and the second sets of spatial streams from one another and to subsequently determine two separate respective channel estimates based on only half the number of sounding symbols that would generally be required in a typical sounding operation.

To orthogonalize the spatial streams, the orthogonalization module 1206 may be configured to first map the first and the second sets of spatial streams to the plurality of tones. In some implementations, the orthogonalization module 1206 may map the first set of spatial streams to a first set of tones and may map the second set of spatial streams to a second set of tones that does not share any tones with the first set of tones. For example, the first set of tones may be interleaved in frequency with the second set of tones. For example, the tones in the first set of tones and the tones in the second set of tones may alternate along a bandwidth of the channel. In some other implementations, the orthogonalization module 1206 may map each spatial stream of both the first and the second sets of spatial streams to both the first and the second sets of tones such that each spatial stream in the second set of spatial streams is orthogonal in frequency to each spatial stream in the first set of spatial streams. For example, the orthogonalization module 1206 may apply a P matrix to the sequence of sounding symbols to map the first and the second sets of spatial streams to the plurality of tones such that each spatial stream in the second set of spatial streams is orthogonal in frequency to each spatial stream in the first set of spatial streams.

The orthogonalization module 1206 is further configured to orthogonalize the first set of spatial streams such that each spatial stream in the first set of spatial streams is orthogonal in time with each of the other spatial streams in the first set of spatial streams. Similarly, the orthogonalization module 1206 is further configured to orthogonalize the second set of spatial streams such that each spatial stream in the second set of spatial streams is orthogonal in time with each of the other spatial streams in the second set of spatial streams. For example, the orthogonalization module 1206 may apply a P matrix to the sequence of sounding symbols such that each spatial stream in the first set of spatial streams is orthogonal in time with each of the other spatial streams in the first set of spatial streams and such that each spatial stream in the second set of spatial streams is orthogonal in time with each of the other spatial streams in the second set of spatial streams. This orthogonalization of the spatial streams in time enables another wireless communication device that receives the sounding packet to distinguish the first set of spatial streams from one another and to distinguish the second set of spatial streams from one another so that it may determine separate channel estimates for both the first and the second sets of spatial streams.

The transmission module 1208 is configured to transmit, or output for transmission (for example, via a radio and a plurality of coupled transmit antennas), the sounding packet including the orthogonalized first and second sets of spatial streams to at least one second wireless communication device. The transmission module 1208 may map each spatial stream in the first set of spatial streams to a corresponding one of a first set of transmit antennas for transmission on the respective antenna, and may map each spatial stream in the second set of spatial streams to a corresponding one of a second set of transmit antennas for transmission on the respective antenna. In implementations in which the first set of spatial streams are mapped to only the first set of tones and the second set of spatial streams are mapped to only the second set of tones, the transmission module 1208 transmits the first set of tones via only the first set of antennas, and transmits the second set of tones via only the second set of antennas. In other implementations in which a P matrix is used to orthogonalize the first and the second sets of spatial streams in frequency, the transmission module 1208 transmits each of the first and the second sets of tones via each of both the first and the second sets of antennas.

Figure 13:
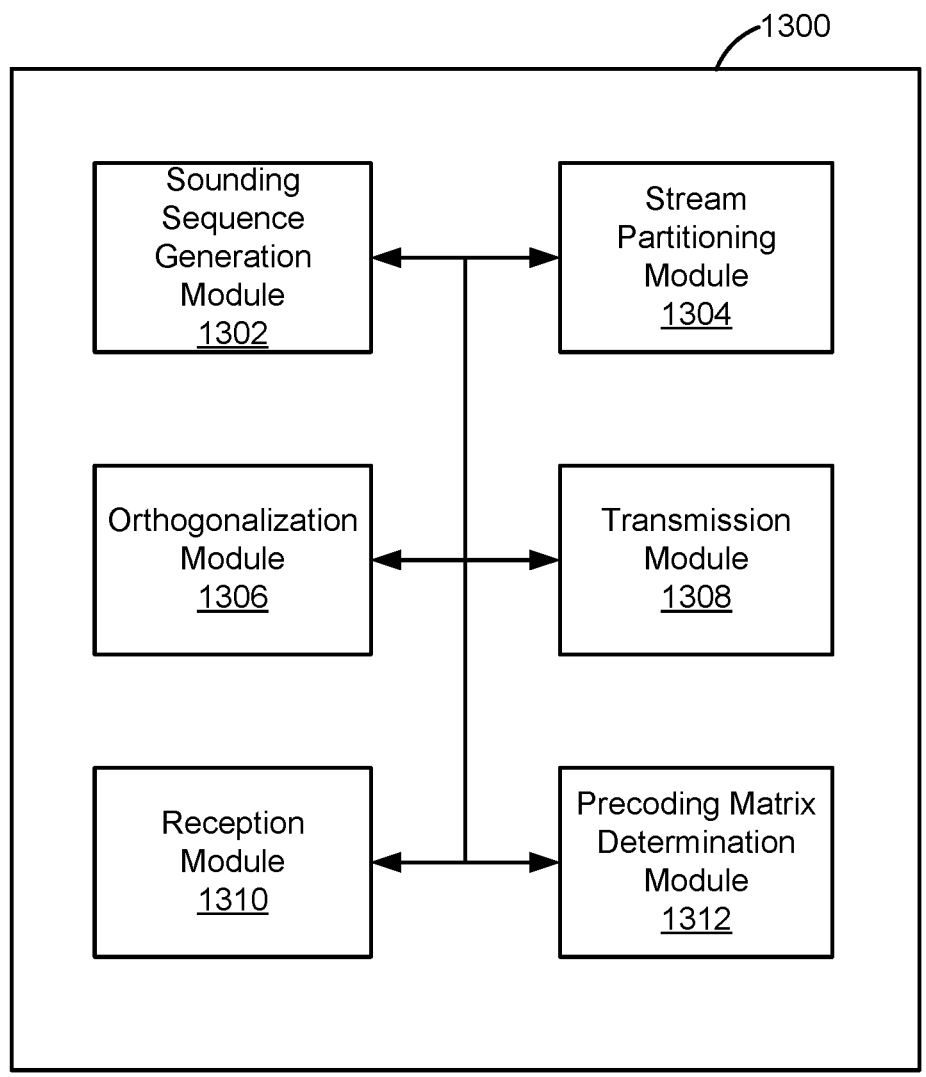
FIG. 13 shows a block diagram of an example wireless communication device for use in wireless communication according to some implementations.

FIG. 13 shows a block diagram of an example wireless communication device 1300 for use in wireless communication according to some implementations. For example, the wireless communication device 1300 is configured to operate as a beamformer. In some implementations, the wireless communication device 1300 is configured to perform one or more of the processes 800, 900 and 1000 described above with reference to FIGS. 8, 9 and 10, respectively. The wireless communication device 1300 may be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.12) modem or a cellular modem). In some implementations, the wireless communication device 1300 can be a device for use in an AP, such as one of the APs 102 and 502 described above with reference to FIGS. 1 and 5A, respectively. In some other implementations, the wireless communication device 1300 can be an AP that includes such a chip, SoC, chipset, package or device as well as at least one transmitter, at least one receiver, and at least one antenna.

The wireless communication device 1300 includes a sounding sequence generation module 1302, a stream partitioning module 1304, an orthogonalization module 1306, a transmission module 1308, a reception module 1310, and a precoding matrix determination module 1312. Portions of one or more of the modules 1302, 1304, 1306, 1308, 1310 and 1312 may be implemented at least in part in hardware or firmware. For example, portion of some or all of the modules 1302, 1304, 1306, 1308, 1310 and 1312 may be implemented at least in part by a modem (such as the modem 402). In some implementations, at least a portion of one or more of the modules 1302, 1304, 1306, 1308, 1310 and 1312 are implemented at least in part as software stored in a memory (such as the memory 408). For example, portions of one or more of the modules 1302, 1304, 1306, 1308, 1310 and 1312 can be implemented as non-transitory instructions (or "code") executable by a processor (such as the processor 406) to perform the functions or operations of the respective module.

The sounding sequence generation module 1302 is configured to generate a sounding packet including a sequence of sounding symbols to be transmitted via each of a plurality of spatial streams and via a plurality of tones. For example, the sounding sequence generation module 1302 can be an example of the sounding sequence generation module 1202 described with reference to FIG. 12.

The stream partitioning module 1304 is configured to provide the plurality of spatial streams based on the sequence of sounding symbols and to partition the spatial streams into a first set of spatial streams and a second set of spatial streams. For example, the stream partitioning module 1304 can be an example of the stream partitioning module 1204 described with reference to FIG. 12.

The orthogonalization module 1306 is configured to orthogonalize the first and the second sets of spatial streams such that each spatial stream in the second set of spatial streams is orthogonal to each spatial stream in the first set of spatial streams in one or both of time or frequency. For example, the orthogonalization module 1306 can be an example of the orthogonalization module 1206 described with reference to FIG. 12.

The transmission module 1308 is configured to transmit, or output for transmission (for example, via a radio and a plurality of coupled transmit antennas), the sounding packet including the orthogonalized first and second sets of spatial streams to at least one second wireless communication device. For example, the transmission module 1308 can be an example of the transmission module 1208 described with reference to FIG. 12.

The reception module 1310 is configured to receive packets including one or more packets from a second wireless communication device based on the sounding packet transmitted by the transmission module 1308. The one or more packets may include channel feedback information for the first and the second sets of spatial streams used to transmit the sounding packet. For example, each of the one or more packets may include a CBF report. In some implementations, the reception module 1310 may receive two or more feedback packets from the second wireless communication device, for example, a first feedback packet including first compressed feedback information for the first set of spatial streams and a second feedback packet including second compressed feedback information for the second set of spatial streams.

In some implementations, the channel feedback information further includes SNR information. For example, the SNR information may include first SNR information received with the first feedback information in a first feedback packet, and second SNR information received with the second feedback information in a second feedback packet. In some other implementations, the first SNR information may be combined with the second SNR information and received in a single feedback packet with the rest of the channel feedback information. In some implementations, the SNR information comprises an average SNR over all tones of the plurality of tones. Additionally, in MU-MIMO implementations, the SNR information may further include, for each tone of the plurality of tones, a deviation of the respective SNR for the tone relative to the average SNR.

The precoding matrix determination module 1312 is configured to determine one or more precoding matrices based on the channel feedback information. In some implementations, the channel feedback information may be compressed feedback information and the precoding matrix determination module 1312 is configured to decompress the compressed feedback information to obtain the relevant information.

In implementations in which the channel feedback information includes first feedback information for the first set of spatial streams separate from second feedback information for the second set of spatial streams, the precoding matrix determination module 1312 may decompress first feedback information to obtain a first set of angles $\varphi_{Ak}$ and a second set of angles $\psi_{Ak}$ for the first set of spatial streams, and decompress the second feedback information to obtain a first set of angles $\varphi_{Bk}$ and a second set of angles $\psi_{Bk}$ for the second set of spatial streams. In such cases, the generation of the one or more precoding matrices may consist of generating a single precoding matrix based on the first set of angles $\varphi_{Ak}$ and the second set of angles $\psi_{Ak}$ associated with the first set of spatial streams, and also based on the first set of angles $\varphi_{Bk}$ and the second set of angles $\psi_{Bk}$ associated with the second set of spatial streams.

Alternatively, the first wireless communication device 1300 may receive a single feedback packet from the second wireless communication device that includes combined compressed feedback information. In such instances, the feedback information may include a first set of angles $\varphi_k$ and a second set of angles $\psi_k$ associated with the entire plurality of spatial streams including both the first and the second sets of spatial streams. The precoding matrix determination module 1312 may then generate a single precoding matrix based on the first set of angles $\varphi_k$ and the second set of angles $\psi_k$ associated with the combined feedback information.

The transmission module 1308 is further configured to transmit, or output for transmission, at least one PPDU including data to be transmitted to the second wireless communication device via one or more data streams. For example, the transmission module 1308 may determine to transmit one or more data streams based on spatial multiplexing a single data stream into the one or more data streams. The transmission module 1308 may generate one or more precoded streams based on applying the one or more precoding matrices determined by the precoding matrix determination module 1312 to the one or more data streams. The transmission module 1308 may then map the precoded streams to the antennas and transmit, or output for transmission, the one or more precoded streams to the second wireless communication device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless communication device comprising:
    receiving, from a second wireless communication device, a sounding packet including a sequence of sounding symbols, the sequence of sounding symbols being received via a plurality of spatial streams and via a plurality of tones;
    performing measurements on the plurality of tones based on the received sounding symbols;
    determining a first channel estimate for a first set of spatial streams of the plurality of spatial streams for each tone of a first set of tones of the plurality of tones based on the measurements;
    determining a second channel estimate for a second set of spatial streams of the plurality of spatial streams for each tone of a second set of tones of the plurality of tones based on the measurements;
    determining a first correlation for the first set of spatial streams for each tone of the first set of tones based on the first channel estimate;
    determining a second correlation for the second set of spatial streams for each tone of the second set of tones based on the second channel estimate;
    determining an average correlation for each of a number of sets of adjacent tones of the plurality of tones based on averaging the first and the second correlations for the tones in the respective set of adjacent tones;
    determining channel feedback information based on the average correlation; and
    outputting for transmission one or more packets including the channel feedback information.

2. The method of claim 1, wherein each spatial stream in the first set of spatial streams is orthogonal in time with each of the other spatial streams in the first set of spatial streams, and wherein each spatial stream in the second set of spatial streams is orthogonal in time with each of the other spatial streams in the second set of spatial streams, and wherein the method further comprises deorthogonalizing the received spatial streams in time, wherein the measurements are performed on the deorthogonalized sequence of sounding symbols.

3. The method of claim 1, wherein the first set of tones is interleaved in frequency with the second set of tones and wherein the first and the second sets of tones do not share any tones.

4. The method of claim 3, wherein the first set of spatial streams is transmitted and received only on the first set of tones, and the second set of spatial streams is transmitted and received only on the second set of tones.

5. The method of claim 3, wherein:
    the first set of spatial streams is transmitted and received on each tone of both the first and the second sets of tones;
    the second set of spatial streams is transmitted and received on each tone of both the first and the second sets of tones;
    each spatial stream in the first set of spatial streams is orthogonal in frequency with each spatial stream in the second set of spatial streams;
    each spatial stream in the second set of spatial streams is orthogonal in frequency with each spatial stream in the first set of spatial streams; and
    the method further comprises deorthogonalizing the received spatial streams in frequency, wherein the measurements are performed on the deorthogonalized sequence of sounding symbols.

6. The method of claim 1, wherein:
    the determination of the first correlation comprises determining a first correlation matrix for the first set of spatial streams for each tone of the first set of tones based on multiplying the first channel estimate by its conjugate transpose; and
    the determination of the second correlation comprises determining a second correlation matrix for the second set of spatial streams for each tone of the second set of tones based on multiplying the second channel estimate by its conjugate transpose.

7. The method of claim 1, wherein the determination of the average correlation comprises determining an average correlation matrix for each set of adjacent tones of the number of sets of adjacent tones based on averaging the first and the second correlation matrices for the tones in the respective set of adjacent tones, the method further comprising:
    determining an eigenvector matrix for each set of adjacent tones based on performing an eigenvalue decomposition of the respective average correlation matrix;

determining a first feedback matrix for each tone of the first set of tones for the first set of spatial streams based on the respective eigenvector matrix and the first channel estimate; and determining a second feedback matrix for each tone of the second set of tones for the second set of spatial streams based on the respective eigenvector matrix and the second channel estimate;

wherein the determination of the channel feedback information based on the average correlation matrix comprises determining the channel feedback information based on the first and the second feedback matrices.

8. The method of claim 7, wherein:

the determination of the first feedback matrix for each tone of the first set of tones for the first set of spatial streams comprises determining the first feedback matrix based on multiplying the conjugate transpose of the respective eigenvector matrix and the first channel estimate for the respective tone; and the determination of the second feedback matrix for each tone of the second set of tones for the second set of spatial streams comprises determining the second feedback matrix based on multiplying the conjugate transpose of the respective eigenvector matrix and the second channel estimate for the respective tone.

9. The method of claim 8, further comprising:

determining a first signal matrix for each tone for the first set of spatial streams based on the multiplication of the conjugate transpose of the respective eigenvector matrix and the first channel estimate for the respective tone; and determining a second signal matrix for each tone for the second set of spatial streams based on the multiplication of the conjugate transpose of the respective eigenvector matrix and the second channel estimate for the respective tone.

10. The method of claim 9, wherein:

the determinations of the first feedback matrix and the first signal matrix comprise determining eigenvalues of the first signal matrix to normalize power associated with respective eigenvectors of the first feedback matrix; and the determinations of the second feedback matrix and the second signal matrix comprise determining eigenvalues of the second signal matrix to normalize power associated with respective eigenvectors of the second feedback matrix.

11. The method of claim 9, further comprising determining signal-to-noise ratio (SNR) information based on the first signal matrix and the second signal matrix, wherein the one or more packets output for transmission include the SNR information.

12. The method of claim 11, wherein the SNR information comprises an average SNR over all tones of the plurality of tones, and wherein the SNR information further comprises, for each tone of the plurality of tones, a deviation of the respective SNR for the tone relative to the average SNR.

13. The method of claim 7, wherein the determination of the channel feedback information comprises determining compressed feedback information based on the first and the second feedback matrices, and wherein the one or more packets output for transmission include the compressed feedback information.

14. The method of claim 13, wherein:

the determination of the compressed feedback information comprises:

determining a first set of angles $\varphi_{Ak}$ and a second set of angles $\psi_{Ak}$ for the first set of spatial streams based on performing a Givens rotation operation on the eigenvectors of the first feedback matrix;

determining a first set of angles $\varphi_{Bk}$ and a second set of angles $\psi_{Bk}$ for the second set of spatial streams based on performing a Givens rotation operation on the eigenvectors of the second feedback matrix;

determining first compressed feedback information for the first set of spatial streams based on quantizing the first set of angles $\varphi_{Ak}$ and quantizing the second set of angles $\psi_{Ak}$; and determining second compressed feedback information for the second set of spatial streams based on quantizing the first set of angles $\varphi_{Bk}$ and quantizing the second set of angles $\psi_{Bk}$; and the one or more packets output for transmission include the first compressed feedback information and the second compressed feedback information.

15. The method of claim 13, wherein the determination of the compressed feedback information comprises:

determining a combined feedback matrix based on combining the first feedback matrix and the second feedback matrix;

determining a first set of angles $\varphi_k$ and a second set of angles $\psi_k$ for the plurality of spatial streams based on performing a Givens rotation operation on the eigenvectors of the combined feedback matrix; and determining the compressed feedback information for the plurality of spatial streams based on quantizing the first set of angles $\varphi_k$ and quantizing the second set of angles $\psi_k$.

16. A method for wireless communication by a first wireless communication device comprising:

generating a sounding packet including a sequence of sounding symbols to be transmitted via each of a plurality of spatial streams and via a plurality of tones;

partitioning the spatial streams into a first set of spatial streams and a second set of spatial streams;

mapping the first set of spatial streams to a first set of tones;

mapping the second set of spatial streams to a second set of tones, wherein the first set of tones is interleaved in frequency with the second set of tones, and wherein the first and the seconds sets of tones do not share any tones;

orthogonalizing the first and the second sets of spatial streams such that each spatial stream in the second set of spatial streams is orthogonal to each spatial stream in the first set of spatial streams in one or both of time or frequency; and outputting the sounding packet including the orthogonalized first and second sets of spatial streams for transmission to a second wireless communication device.

17. The method of claim 16, further comprising:

orthogonalizing the first set of spatial streams such that each spatial stream in the first set of spatial streams is orthogonal in time with each of the other spatial streams in the first set of spatial streams; and orthogonalizing the second set of spatial streams such that each spatial stream in the second set of spatial streams is orthogonal in time with each of the other spatial streams in the second set of spatial streams.

18. The method of claim 16, wherein the output of the sounding packet for transmission to the second wireless communication device comprises outputting the orthogonalized first set of spatial streams for transmission on only the first set of tones and outputting the orthogonalized second set of spatial streams for transmission on only the second set of tones.

19. The method of claim 16, wherein:
the orthogonalization of the first and the second sets of spatial streams comprises mapping the first and the second sets of spatial streams to the plurality of tones such that each spatial stream in the second set of spatial streams is orthogonal in frequency to each spatial stream in the first set of spatial streams; and
the output of the sounding packet for transmission to the second wireless communication device comprises outputting the orthogonalized first set of spatial streams for transmission on each of the plurality of tones and outputting the orthogonalized second set of spatial streams for transmission on each of the plurality of tones.

20. The method of claim 16, further comprising:
receiving one or more packets from the second wireless communication device based on the sounding packet, the one or more packets including channel feedback information for the first and second sets of spatial streams;
determining one or more precoding matrices based on the channel feedback information;
generating at least one physical layer convergence protocol (PLCP) protocol data unit (PPDU) including data to be transmitted to the second wireless communication device via one or more data streams;
generating one or more precoded streams based on applying the one or more precoding matrices to the one or more data streams; and
outputting the one or more precoded streams for transmission to the second wireless communication device.

21. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive, from a second wireless communication device, a sounding packet including a sequence of sounding symbols, the sequence of sounding symbols being received via a plurality of spatial streams and via a plurality of tones;
perform measurements on the plurality of tones based on the received sounding symbols;
determine a first channel estimate for a first set of spatial streams of the plurality of spatial streams for each tone of a first set of tones of the plurality of tones based on the measurements;
determine a second channel estimate for a second set of spatial streams of the plurality of spatial streams for each tone of a second set of tones of the plurality of tones based on the measurements;
determine a first correlation for the first set of spatial streams for each tone of the first set of tones based on the first channel estimate;
determine a second correlation for the second set of spatial streams for each tone of the second set of tones based on the second channel estimate;
determine an average correlation for each of a number of sets of adjacent tones of the plurality of tones based on averaging the first and the second correlations for the tones in the respective set of adjacent tones;
determine channel feedback information based on the average correlation; and
output for transmission one or more packets including the channel feedback information.

22. The wireless communication device of claim 21, wherein:
the determination of the first correlation comprises determining a first correlation matrix for the first set of spatial streams for each tone of the first set of tones based on multiplying the first channel estimate by its conjugate transpose; and
the determination of the second correlation comprises determining a second correlation matrix for the second set of spatial streams for each tone of the second set of tones based on multiplying the second channel estimate by its conjugate transpose.

23. The wireless communication device of claim 21, wherein the determination of the average correlation comprises determining an average correlation matrix for each set of adjacent tones of the number of sets of adjacent tones based on averaging the first and the second correlation matrices for the tones in the respective set of adjacent tones, wherein the code is further configured to:
determine an eigenvector matrix for each set of adjacent tones based on performing an eigenvalue decomposition of the respective average correlation matrix;
determine a first feedback matrix for each tone of the first set of tones for the first set of spatial streams based on the respective eigenvector matrix and the first channel estimate; and
determine a second feedback matrix for each tone of the second set of tones for the second set of spatial streams based on the respective eigenvector matrix and the second channel estimate;
wherein the determination of the channel feedback information based on the average correlation matrix comprises determining the channel feedback information based on the first and the second feedback matrices.

24. The wireless communication device of claim 23, wherein:
the determination of the first feedback matrix for each tone of the first set of tones for the first set of spatial streams comprises determining the first feedback matrix based on multiplying the conjugate transpose of the respective eigenvector matrix and the first channel estimate for the respective tone; and
the determination of the second feedback matrix for each tone of the second set of tones for the second set of spatial streams comprises determining the second feedback matrix based on multiplying the conjugate transpose of the respective eigenvector matrix and the second channel estimate for the respective tone.

25. The wireless communication device of claim 24, wherein the code is further configured to:
determine a first signal matrix for each tone for the first set of spatial streams based on the multiplication of the conjugate transpose of the respective eigenvector matrix and the first channel estimate for the respective tone; and
determine a second signal matrix for each tone for the second set of spatial streams based on the multiplication of the conjugate transpose of the respective eigenvector matrix and the second channel estimate for the respective tone.

26. The wireless communication device of claim 25, wherein:
- the determinations of the first feedback matrix and the first signal matrix comprise determining eigenvalues of the first signal matrix to normalize power associated with respective eigenvectors of the first feedback matrix; and
- the determinations of the second feedback matrix and the second signal matrix comprise determining eigenvalues of the second signal matrix to normalize power associated with respective eigenvectors of the second feedback matrix.

27. The wireless communication device of claim 25, wherein the code is further configured to determine signal-to-noise ratio (SNR) information based on the first signal matrix and the second signal matrix, wherein the one or more packets output for transmission include the SNR information.

28. A wireless communication device comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - generate a sounding packet including a sequence of sounding symbols to be transmitted via each of a plurality of spatial streams and via a plurality of tones;
  - partition the spatial streams into a first set of spatial streams and a second set of spatial streams;
  - map the first set of spatial streams to a first set of tones;
  - map the second set of spatial streams to a second set of tones, wherein the first set of tones is interleaved in frequency with the second set of tones, and wherein the first and the seconds sets of tones do not share any tones;
  - orthogonalize the first and the second sets of spatial streams such that each spatial stream in the second set of spatial streams is orthogonal to each spatial stream in the first set of spatial streams in one or both of time or frequency; and
  - output the sounding packet including the orthogonalized first and second sets of spatial streams for transmission to a second wireless communication device.

29. The wireless communication device of claim 28, wherein the code is further configured to:
- receive one or more packets from the second wireless communication device based on the sounding packet, the one or more packets including channel feedback information for the first and second sets of spatial streams;
- determine one or more precoding matrices based on the channel feedback information;
- generate at least one physical layer convergence protocol (PLCP) protocol data unit (PPDU) including data to be transmitted to the second wireless communication device via one or more data streams;
- generate one or more precoded streams based on applying the one or more precoding matrices to the one or more data streams; and
- output the one or more precoded streams for transmission to the second wireless communication device.

* * * * *